United States Patent
Souma

(10) Patent No.: US 7,633,686 B2
(45) Date of Patent: Dec. 15, 2009

(54) ZOOM OPTICAL SYSTEM, IMAGE SENSING DEVICE, AND DIGITAL APPARATUS

(75) Inventor: Yoshihito Souma, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 0 days.

(21) Appl. No.: 12/050,399

(22) Filed: Mar. 18, 2008

(65) Prior Publication Data
US 2008/0231968 A1 Sep. 25, 2008

(30) Foreign Application Priority Data
Mar. 22, 2007 (JP) ............................. 2007-074324

(51) Int. Cl.
*G02B 15/14* (2006.01)
(52) U.S. Cl. ...................... 359/686; 359/676
(58) Field of Classification Search ................. 359/686, 359/680–682
See application file for complete search history.

(56) References Cited

U.S. PATENT DOCUMENTS

| 7,042,651 | B2 | 5/2006 | Kuba et al. ............... 359/682 |
| 7,177,095 | B2 | 2/2007 | Sugiyama et al. ......... 359/689 |
| 2005/0030641 | A1* | 2/2005 | Kuba et al. ............... 359/686 |
| 2005/0259334 | A1 | 11/2005 | Sekita ....................... 359/691 |
| 2008/0117525 | A1* | 5/2008 | Ichikawa et al. .......... 359/684 |

* cited by examiner

*Primary Examiner*—Ricky L Mack
*Assistant Examiner*—James R Greece
(74) *Attorney, Agent, or Firm*—Sidley Austin LLP

(57) ABSTRACT

A zoom optical system includes first through fourth lens groups having negative-positive-negative-positive optical powers. Assuming that a curvature radius of an object-side lens surface of a negative lens element in the first lens group is r1, a curvature radius of an image-side lens surface of the negative lens element in the first lens group is r2, a focal length of the third lens group is f3, a focal length of the entirety of the optical system at the wide angle end is fw, a focal length of the entirety of the optical system at the telephoto end is ft, and an average refractive index of positive lens elements in the second lens group is nd2p, the zoom optical system satisfies the conditional expressions:

$0 < (r1+r2)/(r1-r2) < 1.0$ $-0.9 < f3/\sqrt{(fw \times ft)} < -0.4$ $1.6 < ndp2.$

20 Claims, 9 Drawing Sheets

[W]

[M]

[T]

ZOOM OPTICAL SYSTEM, IMAGE SENSING DEVICE, AND DIGITAL APPARATUS

This application is based on Japanese Patent Application No. 2007-074324 filed on Mar. 22, 2007, the contents of which are hereby incorporated by reference.

BACKGROUND OF THE INVENTION

1. Field of the Invention

The present invention relates to a zoom optical system for use in an optical unit or a like device, and more particularly to a zoom optical system having a zoom ratio of about two to five times, as well as an image sensing device incorporated with the zoom optical system, and a digital apparatus loaded with the image sensing device.

2. Description of the Related Art

In recent years, digital cameras are rapidly spread, and are widely used not only as means for inputting images into a personal computer, but also as a tool for keeping photos, as well as conventional silver halide cameras. In particular, digital cameras whose zoom ratio is about three times are widely spread in the aspect of a compact size and superior usability. As the digital cameras are widely spread, a demand for a miniaturized zoom lens is increased. Miniaturization in this context embraces miniaturization both in the size of an optical unit in use, and the size of the optical unit in a lens barrel collapsed condition. Also, since the number of pixels of an image sensor is being increased year by year, there is a demand for higher optical performance. Further, there is a demand for high optical performance, as compared with a conventional arrangement, in an apparatus such as a cam recorder primarily used in recording moving images, considering a still image photographing function and a demand for compatibility with high definition devices.

As a zoom lens system capable of satisfying the aforementioned demands, a three-group zoom lens is widely known, wherein a first lens group having a negative optical power, a second lens group having a positive optical power, and a third lens group having a positive optical power are arranged in this order from the object side toward the image side, as disclosed in e.g. US2005/0259334A1 (hereinafter, called as "D1"). The three-group zoom lens has a reduced error sensitivity resulting from decentering, and is feasibly producible, in addition to high optical performance at a relatively small size.

There is also known a four-group zoom lens, wherein a first lens group having a negative optical power, a second lens group having a positive optical power, a third lens group having a negative optical power, and a fourth lens group having a positive optical power are arranged in this order from the object side, as disclosed in e.g. U.S. Pat. No. 7,042,651 B2 (hereinafter, called as "D2"). The four-group zoom lens is advantageous in miniaturizing the optical system, without unduly increasing the optical power of the second lens group or the moving amount of the second lens group, by distributing a zooming load to the second lens group and the third lens group while partially overlapping the moving ranges of the second lens group and the third lens group at the time of zooming.

In the zoom optical system disclosed in D1, the zooming load is concentrated to the second lens group. This necessitates securing the moving distance of the second lens group depending on an intended zoom ratio, or increasing the optical power of the second lens group without increasing the moving distance of the second lens group in order to attain the intended zoom ratio. The former arrangement may obstruct miniaturization of the optical system, and the latter arrangement may make it difficult to correct various aberrations resulting from increasing the optical power. In the zoom optical system disclosed in D1, a meniscus lens element is used as a lens element in the first lens group. Accordingly, the thickness of the optical axis direction of the first lens group may be unduly increased, which may obstruct miniaturization of the optical unit in a lens barrel collapsed condition.

The zoom optical system disclosed in D2 has not sufficiently accomplished miniaturization. The zoom optical system in D2 has a great distortion aberration at a wide angle end.

SUMMARY OF THE INVENTION

In view of the above problems residing in the conventional art, it is an object of the present invention to provide a high-performance and compact zoom optical system, as well as an image sensing device and a digital apparatus incorporated with the zoom optical system.

In order to attain the above object, a zoom optical system according to an aspect of the invention includes in the order from an object side: a first lens group having a negative optical power; a second lens group having a positive optical power; a third lens group having a negative optical power; and a fourth lens group having a positive optical power, wherein in zooming from a wide angle end to a telephoto end, at least the second lens group and the third lens group are moved in a state that a moving range of the second lens group is partially overlapped with a moving range of the third lens group, the first lens group is constituted of a negative lens element and a positive lens element, the second lens group is constituted of two or more lens elements, the third lens group is constituted of a negative lens element, and the zoom optical system satisfies the following conditional expressions (1), (2), and (3):

$$0 < (r1+r2)/(r1-r2) < 1.0 \tag{1}$$

$$-0.9 < f3/\sqrt{(fw \times ft)} < -0.4 \tag{2}$$

$$1.6 < ndp2 \tag{3}$$

where $r1$ is a curvature radius of an object-side lens surface of the negative lens element in the first lens group, $r2$ is a curvature radius of an image-side lens surface of the negative lens element in the first lens group, $f3$ is a focal length of the third lens group, $fw$ is a focal length of an entirety of the optical system at the wide angle end, $ft$ is a focal length of the entirety of the optical system at the telephoto end, and $nd2p$ is an average refractive index of a positive lens element in the second lens group.

An image sensing device according to another aspect of the invention includes: an image sensor, with a light receiving surface, for converting an optical image into an electrical signal; and a zoom optical system for forming the optical image of a subject on the light receiving surface of the image sensor, wherein the zoom optical system has the aforementioned arrangement.

A digital apparatus according to yet another aspect of the invention includes: an image sensor, with a light receiving surface, for converting an optical image into an electrical signal; a zoom optical system for forming the optical image of a subject on the light receiving surface of the image sensor; and a controller for causing the image sensor to perform at least one of a still image photographing and a moving image photographing of the subject, wherein the zoom optical system has the aforementioned arrangement.

These and other objects, features and advantages of the present invention will become more apparent upon reading the following detailed description along with the accompanying drawings.

BRIEF DESCRIPTION OF THE DRAWINGS

FIGS. 1A through 1C are cross-sectional views i.e. optical path diagrams of a zoom optical system embodying the invention, wherein FIG. 1A is an optical path diagram of the zoom optical system at a wide angle end, FIG. 1B is an optical path diagram of the zoom optical system at a middle position, and FIG. 1C is an optical path diagram of the zoom optical system at a telephoto end.

FIGS. 2A through 2D are diagrams each showing an external appearance of a digital camera loaded with the zoom optical system of the embodiment of the invention, wherein FIG. 2A is a front view of the digital camera, FIG. 2B is a top plan view of the digital camera, FIG. 2C is a side view of the digital camera, and FIG. 2D is a rear view of the digital camera.

FIGS. 4A through 4C are cross-sectional views i.e. optical path diagrams of a zoom optical system in Example 1, wherein FIG. 4A is an optical path diagram of the zoom optical system at a wide angle end, FIG. 4B is an optical path diagram of the zoom optical system at a middle position, and FIG. 4C is an optical path diagram of the zoom optical system at a telephoto end.

FIGS. 5A through 5C are cross-sectional views i.e. optical path diagrams of a zoom optical system in Example 2, wherein FIG. 5A is an optical path diagram of the zoom optical system at a wide angle end, FIG. 5B is an optical path diagram of the zoom optical system at a middle position, and FIG. 5C is an optical path diagram of the zoom optical system at a telephoto end.

FIGS. 6A through 6C are cross-sectional views i.e. optical path diagrams of a zoom optical system in Example 3, wherein FIG. 6A is an optical path diagram of the zoom optical system at a wide angle end, FIG. 6B is an optical path diagram of the zoom optical system at a middle position, and FIG. 6C is an optical path diagram of the zoom optical system at a telephoto end.

DESCRIPTION OF THE PREFERRED EMBODIMENTS

Figure 1A:
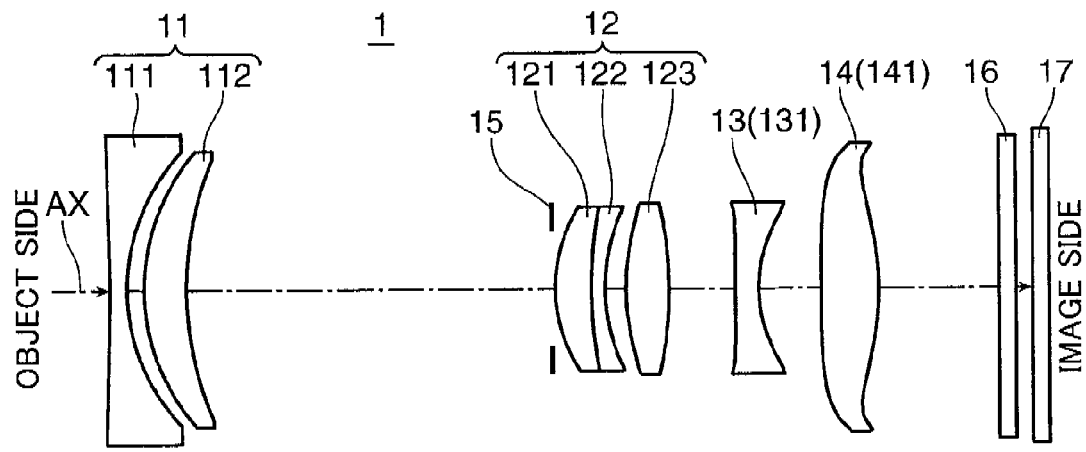

In the following, an embodiment of the invention is described referring to the drawings. The terms used in the following description are defined as follows throughout the specification.

(a) The refractive index is a refractive index with respect to d-ray (wavelength: 587.56 nm).

(b) The Abbe number is an Abbe number vd obtained by the following definitional equation:

$$vd=(nd-1)/(nF-nC)$$

where nd, nF, and nC are refractive indexes with respect to d-ray, F-ray (wavelength: 486.13 nm), and C-ray (wavelength: 656.28 nm), respectively, and vd is the Abbe number.

(c) The indication concerning a plane configuration is an indication based on paraxial curvature.

(d) Concerning lens elements, the indication "concave", "convex", or "meniscus" shows a shape of a lens element near the optical axis i.e. near the center of the lens element, in other words, shows a shape based on paraxial curvature.

<Description on Arrangement of Zoom Optical System>

Figure 1B:
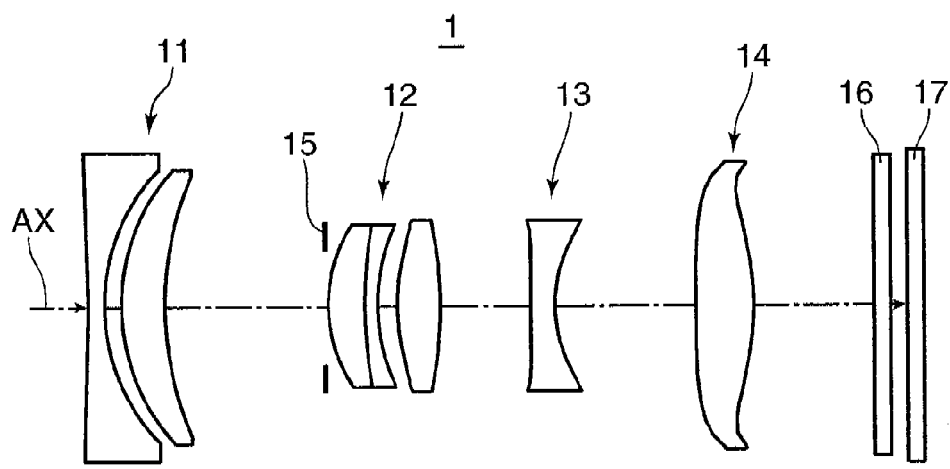
Figure 1C:
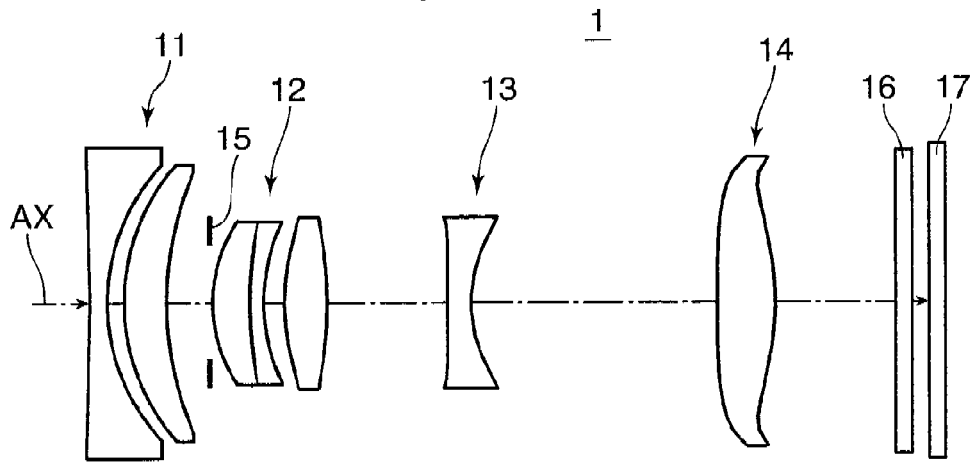

FIGS. 1A through 1C are cross-sectional views i.e. optical path diagrams of a zoom optical system 1 embodying the invention. FIG. 1A is an optical path diagram of the zoom optical system 1 at a wide angle end, FIG. 1B is an optical path diagram of the zoom optical system 1 at a middle position, and FIG. 1C is an optical path diagram of the zoom optical system 1 at a telephoto end. The zoom optical system 1 is adapted to form an optical image of a subject on a light receiving surface i.e. an imaging plane of an image sensor 17 for converting the optical image into an electric signal. The zoom optical system 1 is constructed in such a manner that a first lens group 11 having a negative optical power, a second lens group 12 having a positive optical power, a third lens group 13 having a negative optical power, and a fourth lens group 14 having a positive optical power are arranged in this order from an object side; and that the first lens group 11, the second lens group 12, and the third lens group 13 are moved in zooming from the wide angle end to the telephoto end. The zoom optical system 1 illustrated in FIGS. 1A through 1C have the same arrangement as a zoom optical system 1A (see FIGS. 4A through 4C) in Example 1, which will be described later.

The first lens group 11 is constituted of a biconcave negative lens element 111 and a positive meniscus lens element 112 convex to the object side. The second lens group 12 is constituted of a cemented lens element made of a positive meniscus lens element 121 convex to the object side, and a negative meniscus lens element 122 convex to the object side, and a biconvex positive lens element 123. The third lens group 13 is constituted merely of a biconcave negative lens element 131. The fourth lens group 14 is constituted merely of a biconvex positive lens element 141. An optical diaphragm 15 i.e. an aperture stop is arranged on the object side of the second lens group 12. The image sensor 17 is arranged on the image side of the zoom optical system 1 via a low-pass filter 16. With this arrangement, an optical image of the subject on the object side is guided to the light receiving surface of the image sensor 17 at a proper zoom ratio along an optical axis AX by the zoom optical system 1, whereby the optical image of the subject is captured by the image sensor 17.

The zoom optical system 1 is a four-component optical system of negative-positive-negative-positive arrangement, and is a negative dominant optical system having a feature that the first lens group 11 has a negative optical power. This enables to promptly alleviate emission of light rays incident from the object side with a large angle by the negative optical power of the first lens group 11, which is advantageous in reducing the entire length of the optical system or the diameter of the forward most lens element. Also, in the negative dominant arrangement, increase of error sensitivity can be suppressed despite miniaturization of the optical system.

In the zoom optical system 1, the first lens group 11, the second lens group 12, and the third lens group 13 are moved in zooming from the wide angle end to the telephoto end. Thereby, the zooming load can be distributed to the second lens group 12 and the third lens group 13, which enables to relatively reduce the zooming load of the respective lens groups. Further, as is obvious from comparison between FIGS. 1A through 1C, the telephoto end position of the third lens group 13 is over the wide angle end position of the second lens group 12. In other words, the moving range of the second lens group 12 and the moving range of the third lens group 13 are partially overlapped with each other. This enables to facilitate miniaturization of the optical system while securing an intended zoom ratio.

The first lens group 11 is constituted of two lens elements i.e. the negative lens element 111 and the positive meniscus lens element 112. The second lens group 12 is constituted of two or more lens elements i.e. the positive meniscus lens element 121, the negative meniscus lens element 122, and the positive lens element 123. The third lens group 13 is constituted merely of the negative lens element 131. Preparing two lens elements i.e. a negative lens element and a positive lens element in the first lens group 11 enables to correct chromatic aberration without using a diffractive optical element or a low dispersion glass element, which are disadvantageous in cost or production. The second lens group 12 plays a primarily role in a converging action of the optical system. Accordingly, preparing two or more lens elements in the second lens group 12 enables to realize high optical performance. Since the height of an on-axis ray in the third lens group 13 is relatively low, it is possible to realize high optical performance even with a single lens element. Also, since the third lens group generally serves as a focus lens group, constituting the third lens group of a single lens element enables to realize high-speed focusing, reduce the consumption electric power at the time of driving, and contribute to miniaturization of a driving actuator.

As shown in FIGS. 1A through 1C, preferably, the second lens group 12 is constructed in such a manner that the positive meniscus lens element 121 and the negative meniscus lens element 122 are arranged in this order from the object side. In the zoom optical system 1, the height of an on-axis ray to be incident onto the second lens group 12 is increased by a diverging action of the first lens group 11 having a negative optical power. In view of this, arranging the positive meniscus lens element 121 at a position closest to the object side of the second lens group 12 enables to decrease the height of an on-axis ray to be directed toward the image side with respect to the positive meniscus lens element 121. This enables to suppress generation of on-axis aberration. Further, spherical aberration or coma aberration on the positive meniscus lens element 121 can be suppressed by arranging the negative meniscus lens element 122 on the image side of the positive meniscus lens element 121.

Preferably, the image-side lens surface of the positive lens element 123, as a lens surface in the second lens group 12 closest to the image side, is a lens surface whose positive optical power is decreased, as the distance from the optical axis AX is increased, or a lens surface whose negative optical power is increased, as the distance from the optical axis AX is increased. Thus, forming the image-side lens surface of the positive lens element 123 in the second lens group 12 at a position farthest from the diaphragm into an aspherical shape enables to simultaneously correct spherical aberration and astigmatism. Alternatively, a lens surface other than the image-side lens surface of the positive lens element 123 may be formed into an aspherical shape. In particular, forming all the lens surfaces in contact with the air into an aspherical shape enables to realize microminiaturization and high-quality of the zoom optical system 1.

In the zoom optical system 1 having the above arrangement, assuming that a curvature radius of an object-side lens surface of the negative lens element 111 in the first lens group 11 is r1, and a curvature radius of an image-side lens surface of the negative lens element 111 is r2, the zoom optical system 1 satisfies the following conditional expression (1):

$$0 < (r1+r2)/(r1-r2) < 1.0 \tag{1}$$

Satisfying the conditional expression (1) concerning the configuration of the negative lens element 111 enables to miniaturize the zoom optical system 1 while securing high optical performance. If the value of $(r1+r2)/(r1-r2)$ in the conditional expression (1) is over the upper limit of the conditional expression (1), the negative lens element 111 has a meniscus shape, i.e. is concave to the image side, with the result that the thickness of the first lens group 11 may be unduly increased. In this embodiment, this means that the thickness from a vertex of the object-side lens surface of the negative lens element 111 to a lens perimeter of the positive meniscus lens element 112 is increased. The above drawback may obstruct miniaturization of the optical unit in a lens barrel collapsed condition. On the other hand, if the value of $(r1+r2)/(r1-r2)$ in the conditional expression (1) is below the lower limit of the conditional expression (1), the curvature radius of the object-side lens surface of the negative lens element 111 may be unduly decreased. This may increase off-axis aberration such as distortion or field curvature on the object-side lens surface. It is desirable to satisfy the following conditional expression (1)' to more effectively obtain the above advantage.

$$0.5 < (r1+r2)/(r1-r2) < 0.95 \tag{1'}$$

Assuming that a focal length of the third lens group 13 is f3, a focal length of the entirety of the zoom optical system 1 at the wide angle end is fw, and a focal length of the entirety of the zoom optical system 1 at the telephoto end is ft, the optical power of the third lens group 13 satisfies the following conditional expression (2):

$$-0.9 < f3/\sqrt{(fw \times ft)} < -0.4 \tag{2}$$

Satisfying the conditional expression (2) enables to realize miniaturization of the zoom optical system 1 while securing high optical performance. If the configuration of the negative lens element 111 in the first lens group 11 lies in the range defined by the conditional expression (2), a large negative distortion may occur in the negative lens element 111. However, setting the optical power of the third lens group 13 so that the value of $f3/\sqrt{(fw \times ft)}$ is over the lower limit in the conditional expression (2) enables to cancel the negative distortion by generating a large positive distortion in the third lens group 13, and properly distribute the zooming load to the third lens group 13. Thus, miniaturization of the optical system can be realized, while securing an intended zoom ratio. If the value of $f3/\sqrt{(fw \times ft)}$ is below the lower limit of the conditional expression (2), the aforementioned effect cannot be obtained. If, on the other hand, the value of $f3/\sqrt{(fw \times ft)}$ is over the upper limit of the conditional expression (2), the optical power of the third lens group 13 may be unduly increased, which may make it difficult to correct off-axis aberration in the third lens group 13. It is desirable to satisfy the following conditional expression (2)' to more effectively obtain the above advantage.

$$-0.75 < f3/\sqrt{(fw \times ft)} < -0.5 \tag{2'}$$

Assuming that an average refractive index of the positive meniscus lens element 121 and the positive lens element 123 in the second lens group 12 is nd2p, the average refractive index of the positive lens elements in the second lens group 12 satisfies the following conditional expression (3):

$$1.6 < \text{ndp2} \tag{3}$$

Satisfying the conditional expression (3) enables to secure high optical performance of the zoom optical system 1. If the average refractive index ndp2 is below the lower limit of the conditional expression (3), it is required to increase the curvatures of the lens surfaces of the positive meniscus lens element 121 and the positive lens element 123 in order to secure a positive optical power required in the second lens group 12, because the average refractive index of the positive meniscus lens element 121 and the positive lens element 123 is unduly reduced. This may make it difficult to correct spherical aberration or coma aberration.

It is preferable to satisfy the conditional expression (4) concerning the zooming load of the third lens group 13, assuming that a paraxial linear magnification of the third lens group 13 at the telephoto end is β3t, and a paraxial linear magnification of the third lens group 13 at the wide angle end is β3w:

$$0.3 < (\beta 3t/\beta 3w)/(ft/fw) < 0.6 \tag{4}$$

If the value of (β3t/β3w)/(ft/fw) is below the lower limit of the conditional expression (4), the zooming load of the third lens group 13 may be unduly decreased, which necessitates increasing the zooming load of the second lens group 12 to secure an intended zoom ratio. As a result, the optical power of the second lens group 12 may be unduly increased, which may make it difficult to correct aberration. In other case, the moving amounts of the second lens group 12 and the third lens group 13 may be unduly increased to secure an intended zoom ratio. This may obstruct miniaturization of the zoom optical system 1. On the other hand, if the value of (β3t/β3w)/(ft/fw) is over the upper limit of the conditional expression (4), the zooming load of the third lens group 13 may be unduly increased, which may make it difficult to secure high optical performance in the entirety of the zoom range.

Preferably, the optical power of the second lens group 12 satisfies the following conditional expression (5), assuming that a focal length of the second lens group 12 is f2:

$$0.4 < f2/\sqrt{(fw \times ft)} < 0.8 \tag{5}$$

Satisfying the conditional expression (5) enables to optimize the optical power of the second lens group 12, and miniaturize the zoom optical system 1 while securing high optical performance. If the value of $f2/\sqrt{(fw \times ft)}$ is below the lower limit of the conditional expression (5), the optical power of the second lens group 12 may be unduly increased. This is advantageous in miniaturizing the zoom optical system 1, but may make it difficult to correct spherical aberration or coma aberration in the second lens group 12. On the other hand, if the value of $f2/\sqrt{(fw \times ft)}$ is over the upper limit of the conditional expression (5), the optical power of the second lens group 12 may be unduly decreased. This is advantageous in correcting aberration, but may obstruct miniaturization of the zoom optical system 1. It is desirable to satisfy the following conditional expression (5)' to more effectively obtain the above advantage.

$$0.5 < f2/\sqrt{(fw \times ft)} < 0.7 \tag{5'}$$

Preferably, the refractive index of the negative lens element 111 in the first lens group 11 satisfies the following conditional expression (6), assuming that a refractive index of the negative lens element 111 is nd1n $$1.7 < \text{nd1n} \tag{6}$$

If the refractive index nd1n is below the lower limit of the conditional expression (6), the curvature of a lens surface of the negative lens element 111 may be unduly increased to secure a negative optical power required in the first lens group 11, which may increase off-axis aberration. Also, a reduced curvature radius of the negative lens element 111 may unduly increase the thickness of the first lens group 11. This is not desirable in the aspect of miniaturizing the zoom optical system 1.

In the embodiment of the invention, the arranged position of the optical diaphragm 15 is not specifically limited. However, as shown in FIGS. 1A through 1C, it is preferable to arrange the optical diaphragm 15 on the object side of the second lens group 12, and integrally move the second lens group 12 and the optical diaphragm 15 in zooming. This arrangement enables to concurrently move the optical diaphragm 15 and the second lens group 12 having a largest moving amount, which is advantageous in suppressing increase of an effective outer lens diameter of the second lens group 12.

In the following, materials of the constituent elements of the zoom optical system 1 are described. There is no specific constraint on the material of each lens element constituting the first through the fourth lens group 11 through 14. Any optical material such as various glass materials or plastic materials may be used, as far as the optical material satisfies the aforementioned requirements. As a preferred example, a lens element made of a plastic material is used as the negative lens element 131 in the third lens group 13.

Use of a lens element made of a plastic material as the negative lens element 131 enables to reduce the production cost. Also, since the third lens group 13 has the features that the height of an on-axis ray is relatively low, and that surface precision error and sensitivity on aberration fluctuation resulting from a temperature change are relatively small, it is suitable to use a plastic lens element in the third lens group 13. The third lens group 13 generally serves as a focus lens group in a four-component optical system. Using a lens element made of a plastic material to reduce the weight of the lens group contributes to reduction of an electric power required for focus driving, and miniaturization of an actuator for focus driving.

Preferably, the plastic lens element is a lens element obtained by molding a plastic material, in which particles having a maximum diameter of 30 nm or less, particularly, inorganic particles are dispersed. Use of the plastic lens element is advantageous in minimizing a refractive index change by a temperature change.

In the following, the refractive index change by a temperature change is described in detail. A refractive index change A by a temperature change is expressed by the following expression (7) by differentiating a refractive index "n" by a temperature "t", based on the Lorenz-Lorenz equation.

$$A = \frac{(n^2+2)(n^2-1)}{6n}\left\{(-3\alpha) + \frac{1}{[R]}\frac{\partial [R]}{\partial t}\right\} \tag{7}$$

where α is a linear expansion coefficient, and [R] is a molecular refraction.

Generally, in the case of a plastic material, contribution of the second term in the expression (7) is smaller than the first term, and accordingly, the second term is significantly negligible. For instance, in the case of PMMA resin, the linear expansion coefficient α is 7×10⁻⁵. Substituting the linear expansion coefficient α in the expression (7) yields A=−1.2×10⁻⁴ [/° C.], which approximately coincides with an actually measured value. Specifically, it is preferable to suppress the refractive index change by a temperature change, which has conventionally been about −1.2×10⁻⁴ [/° C.], to a value smaller than 8×10⁻⁵[/° C.] in absolute value. More preferably, the refractive index change by a temperature change is smaller than 6×10⁵ [/° C.] in absolute value. Setting the refractive index change by a temperature change to a value smaller than 6×10⁻⁵[/° C.] in absolute value enables to suppress a back focusing distance at the time when the ambient temperature changes to about half of the conventional arrangement.

Preferably, the zoom optical system 1 has a mechanical shutter having a function of blocking light from the image sensor 17, in place of the optical diaphragm 15. The mechanical shutter is effective in preventing smear in the case where a CCD (Charge Coupled Device) sensor is used as the image sensor 17, for instance.

A conventional well-known cam mechanism or stepping motor may be used as a drive source for driving the lens groups, the diaphragm, the shutter, or a like member provided in the zoom optical system 1. In the case where the moving amount is small, or the weight of the driving members is light, use of a microminiaturized piezoelectric actuator enables to drive the lens groups independently of each other, while suppressing increase in volume of a driver or electric power consumption. This is advantageous in further miniaturizing an imaging lens device incorporated with the zoom optical system 1.

The low-pass filter 16 is a parallel-plane optical component which is disposed in front of the light receiving surface of the image sensor 17 for removing noise components. Examples of the low-pass filter 16 are a birefringent low-pass filter made of a crystal or a like material, whose predetermined crystalline axis direction is regulated, and a phase low-pass filter for realizing required optical cutoff frequency characteristic by a diffraction effect. It is not necessarily required to provide the low-pass filter 16. Further alternatively, an infrared cutoff filter may be used to reduce noises included in an image signal from the image sensor 17, in place of the aforementioned optical low-pass filter 16. Further alternatively, the function of the birefringent low-pass filter and the function of the phase low-pass filter may be realized by a single low-pass filter by applying infrared reflective coat to a surface of the optical low-pass filter 16.

The image sensor 17 is adapted to photoelectrically convert an optical image of a subject formed by the zoom optical system 1 into image signals of color components of R, G, and B in accordance with the light amount of the subject image for outputting the image signals to a predetermined image processing circuit. For instance, the image sensor 17 is a one-chip color area sensor of a so-called "Bayer matrix", in which patches of color filters each in red (R), green (G), and blue (B) are attached in a checkered pattern on respective surfaces of CCDs of the area sensor arrayed in two dimensions. Examples of the image sensor 17 are a CMOS image sensor, and a VMIS image sensor in addition to the CCD image sensor.

<Description on Digital Apparatus Incorporated with Zoom Optical System>

In this section, a digital apparatus incorporated with the zoom optical system 1 having the above arrangement is described. FIGS. 2A through 2D are diagrams each showing an external appearance of a digital camera 2, as an example of the digital apparatus embodying the invention. In this embodiment, the digital apparatus includes a digital still camera, a video camera, a digital video unit, a PDA (Personal Digital Assistant), a personal computer, a mobile computer, and peripheral devices thereof such as a mouse, a scanner, and a printer.

Figure 2A:
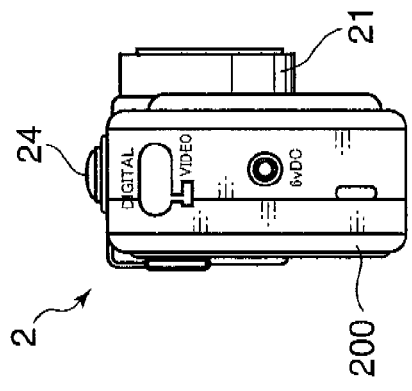
Figure 2C:
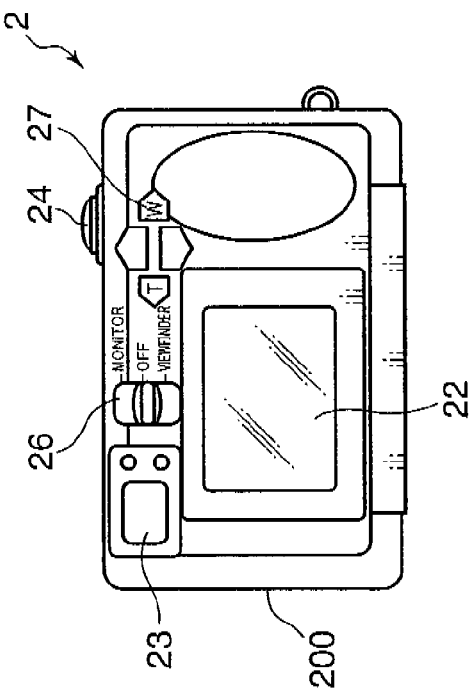
Figure 2B:
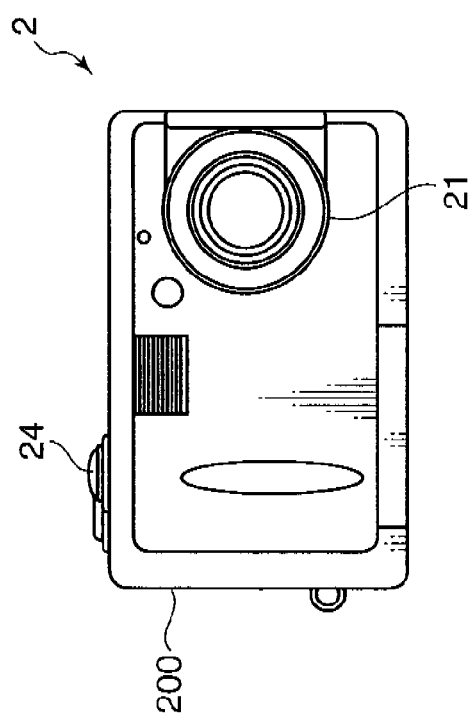
Figure 2D:
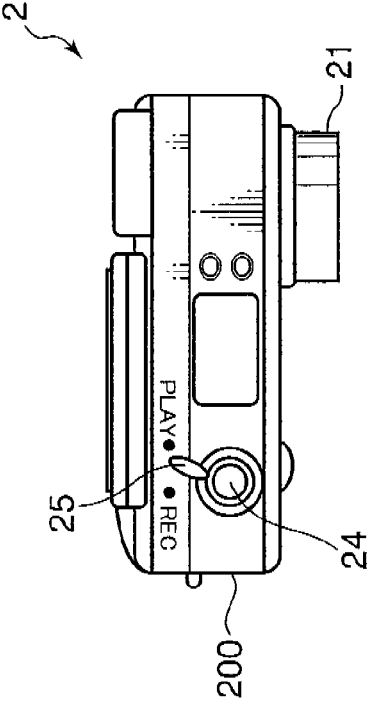

FIG. 2A is a front view of the digital camera 2, FIG. 2B is a top plan view of the digital camera 2, FIG. 2C is a side view of the digital camera 2, and FIG. 2D is a rear view of the digital camera 2. An imaging lens device 21 is provided on the front surface of a camera body 200 of the digital camera 2. The zoom optical system 1 is built in the imaging lens device 21. A display monitor 22 such as an LCD (Liquid Crystal Display), and an electronic viewfinder 23 are provided on the rear surface of the camera body 200. A shutter button 24 for allowing a photographer to designate photographing, and a photographing mode changeover switch 25 for selectively changing over the photographing mode between reproduction mode indicated by PLAY in FIG. 2B and recording mode indicated by REC in FIG. 2B are provided on the top surface of the camera body 200.

A main switch 26 as a slide switch, which functions both as a power on/off switch and a display changeover switch for selectively changing over the display between the electronic viewfinder 23 and the monitor 22, is provided on the rear surface of the camera body 200. A push switch group 27 functioning as a switch for feeding recorded images frame by frame at the reproduction mode, and a zoom switch of the imaging lens device 21 is provided on the right side of the main switch 26. In FIGS. 2A through 2D, the symbol "T" indicates telephoto, and the symbol "W" indicates wide angle.

Figure 3:
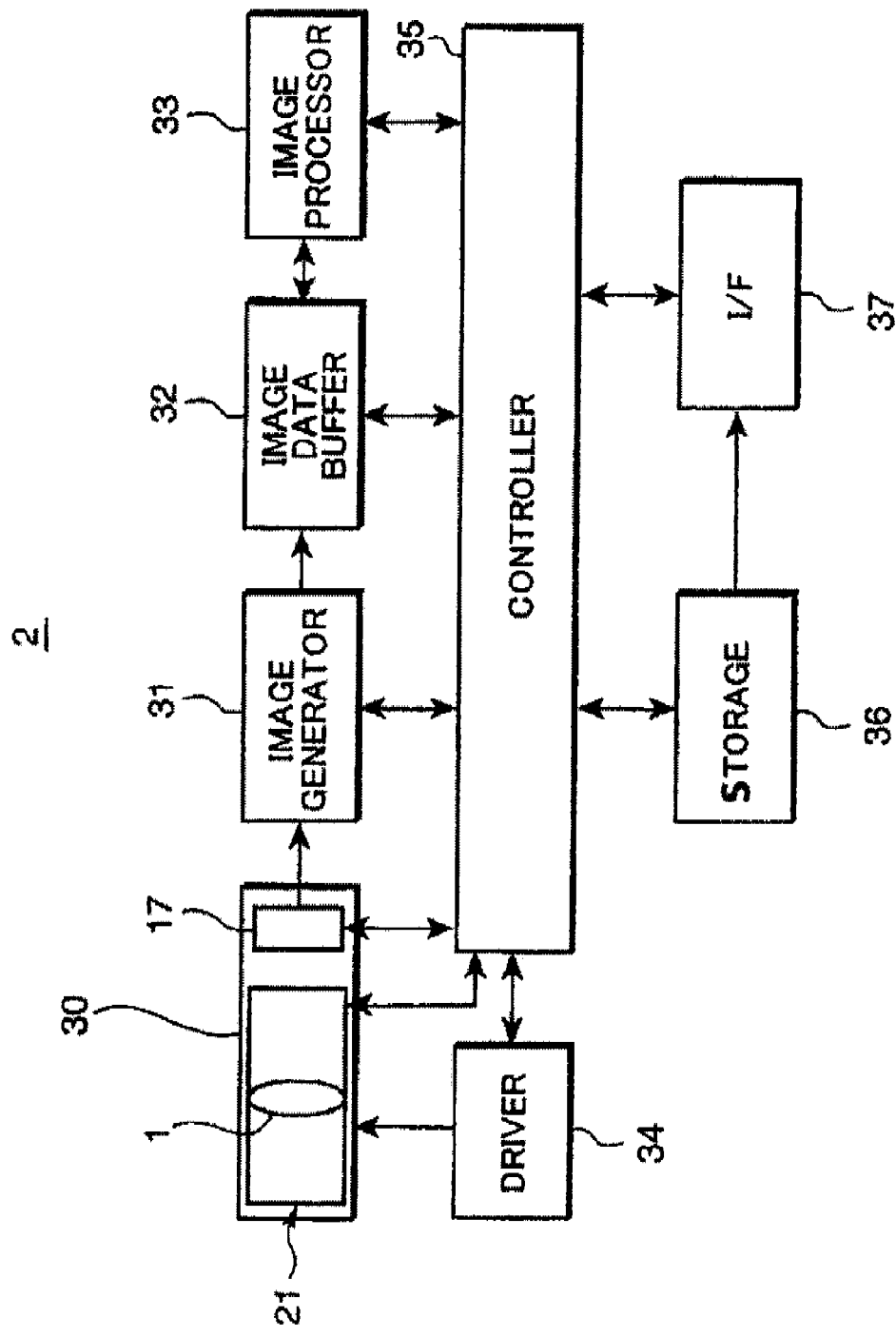
FIG. 3 is a functional block diagram showing a functional configuration of the digital camera, as an example of a digital apparatus incorporated with the zoom optical system of the embodiment of the invention.

FIG. 3 is a functional block diagram showing an electrical configuration on an imaging operation to be performed by the digital camera 2. The digital camera 2 includes an imaging section 30, an image generator 31, an image data buffer 32, an image processor 33, a driver 34, a controller 35, a storage 36, and an I/F (interface) 37.

The imaging section 30 includes the imaging lens device 21 and the image sensor 17. The imaging lens device 21 has the zoom optical system 1 as shown in FIGS. 1A through 1C, and an unillustrated lens driver for driving the lens groups in the optical axis direction for zooming and focusing. Light rays from a subject are focused on the light receiving surface of the image sensor 17 by the zoom optical system 1, thereby forming an optical image of the subject.

The image sensor 17 converts the optical image of the subject formed by the zoom optical system 1 into electric signals of color components of R (red), G (green), and B (blue) for outputting the electric signals to the image generator 31 as image signals of the colors of R, G, and B. The image sensor 17 is operative to perform an imaging operation such as one of a still image sensing operation and a moving image sensing operation, or a readout operation (horizontal scanning, vertical scanning, transfer) of an output signal from each pixel in the image sensor 17 under the control of the controller 35.

The image generator 31 performs amplification processing, digital conversion processing, or a like processing with respect to an analog output signal from the image sensor 17; and performs well-known image processing such as determination of proper black level with respect to the entirety of the image, gamma correction, white balance (WB) adjustment, contour correction, and color disparity correction to generate image data of each pixel based on the image signal. The image data generated by the image generator 31 is outputted to the image data buffer 32.

The image data buffer 32 temporarily stores the image data, and is a memory to be used as a work area for allowing the image processor 33 to perform the following processing with respect to the image data. The image data buffer 32 includes e.g. an RAM (Random Access Memory). The image processor 33 is a circuit for performing image processing such as resolution conversion with respect to the image data temporarily stored in the image data buffer 32. The image processor 33 may be so configured as to correct aberration that has not been corrected by the zoom optical system 1, according to needs. The driver 34 drives the lens groups of the zoom optical system 1 in such a manner that intended zooming and focusing are performed based on a control signal outputted from the controller 35.

The controller 35 includes e.g. a microprocessor, and controls respective operations of the imaging section 30, the image generator 31, the image data buffer 32, the image processor 33, the driver 34, the storage 36, and the I/F 37. Specifically, the controller 35 controls the imaging lens device 21 and the image sensor 17 to perform at least one of a still image photographing operation and a moving image photographing operation of a subject.

The storage 36 is a storing circuit for storing the image data generated by the still image photographing operation or the moving image photographing operation of the subject. The storage 36 includes e.g. an ROM (Read Only Memory) or an RAM. In other words, the storage 36 has a function as a memory for a still image photographing operation or a moving image photographing operation. The I/F 37 is an interface for transmitting and receiving image data to and from an external device. The I/F 37 is an interface in conformity with the standards e.g. USB or IEEE1394.

As an exemplified operation to be executed by the digital camera 2 having the above arrangement, a still image sensing operation is described. First, the controller 35 drives the unillustrated lens driver in the imaging lens device 21 for focusing. Thereby, an optical image of the subject in a focus state is formed on the light receiving surface of the image sensor 17 for conversion into image signals of color components of R, G, and B. Thereafter, the image signals are outputted to the image generator 31. The image signals are temporarily stored in the image data buffer 32 for image processing in the image processor 33. After the image processing, the processed image data is transferred to a memory (not shown) for display so that the image data is displayed on the monitor 22 as a subject image. When the photographer depresses the shutter button 24 in this state, a still image can be captured. In other words, image data is stored in the storage 36 as a memory for a still image sensing operation.

In the above operation, if the photographer wishes to perform zooming, because the subject is located away from the photographer, or the photographer wishes to obtain an enlarged image of the subject nearby, the photographer depresses the portion "T" of the push switch group 27 serving as a zoom button. Then, the controller 35 is operative to drive the lens groups for zooming in accordance with a depressed time, thereby causing the zoom optical system 1 to zoom in the image. If the photographer wishes to reduce the magnification of the subject image because of excessive zooming or a like condition, the photographer depresses the portion "W" of the push switch group 27. Then, the controller 35 drives the lens groups to zoom toward the wide angle end. In this way, the photographer is allowed to adjust the magnification by using the zoom button, even if the subject is away from the photographer. Similarly to normal photographing with the same magnification, an enlarged still image can be captured by adjusting the position of the displayed image in such a manner that the main subject image is located in an intended position within the display screen of the monitor 22, and by depressing the shutter button 24 in this state.

<Description on Examples of Zoom Optical System>

In the following, examples of the zoom optical system 1 as shown in FIGS. 1A through 1C, specifically, the zoom optical system 1 to be built in the imaging lens device 21 to be mounted in the digital camera 2, as shown in FIGS. 2A through 2D, are described referring to the drawings.

EXAMPLE 1

Figure 4A:
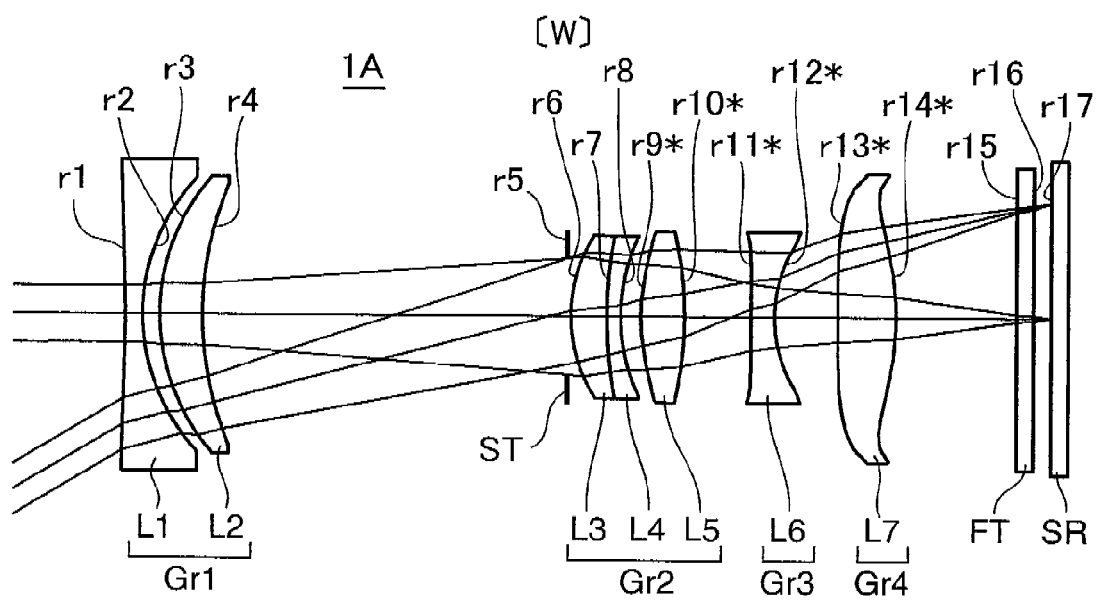
Figure 4B:
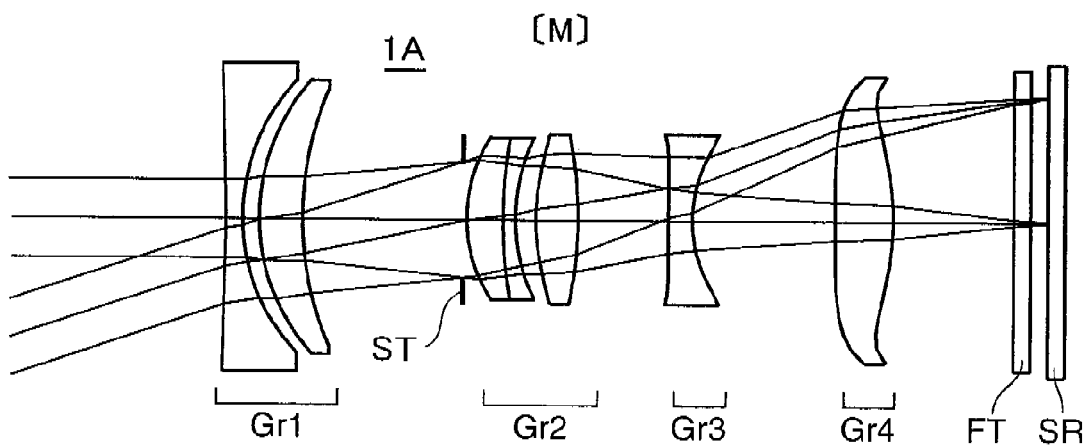
Figure 4C:
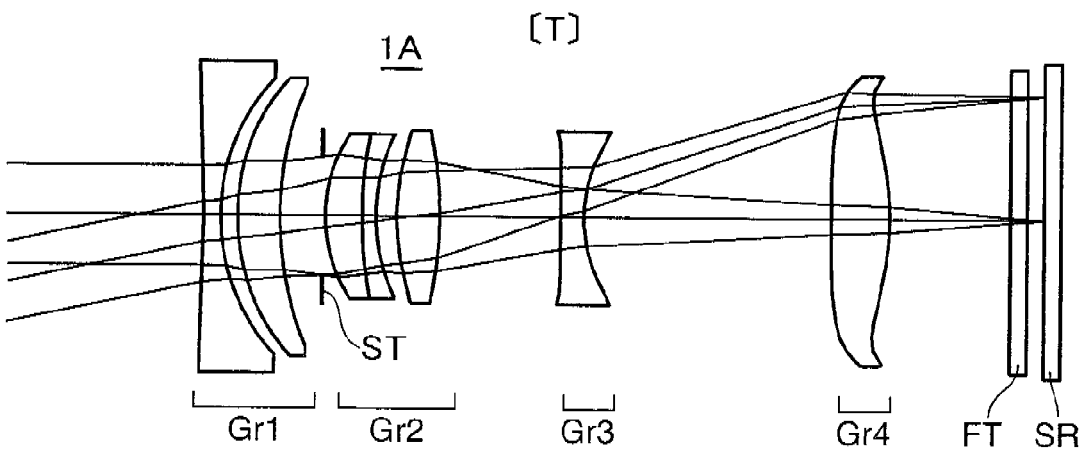

FIGS. 4A through 4C are cross-sectional views i.e. optical path diagrams, taken along the optical axis (AX), each showing an arrangement of lens groups in a zoom optical system 1A in Example 1. In the optical path diagrams of FIGS. 4A through 4C, FIG. 4A shows a lens arrangement at a wide angle end (W), FIG. 4B shows a lens arrangement at a middle position (M), and FIG. 4C shows a lens arrangement at a telephoto end (T). The same definition is applied to optical path diagrams in FIGS. 5A through 5C, and FIGS. 6A through 6C, which will be described later. In Example 1, the zoom optical system 1A includes, in this order from the object side in the drawings i.e. the left side in FIGS. 4A through 4C, a first lens group (Gr1) having a negative optical power as a whole, a second lens group (Gr2) having a positive optical power as a whole, a third lens group (Gr3) having a negative optical power, and a fourth lens group (Gr4) having a positive optical power.

The zoom optical system 1A in Example 1 has the following lens arrangement in the order from the object side. Specifically, the first lens group (Gr1) is constituted of a biconcave negative lens element (first lens element L1), and a positive meniscus lens element (second lens element L2) convex to the object side. The second lens group (Gr2) is constituted of a cemented lens element made of a positive meniscus lens element (third lens element L3) convex to the object side and a negative meniscus lens element (fourth lens element L4) convex to the object side; and a biconvex positive lens element (fifth lens element L5). An aperture stop (ST) which is moved with the second lens group (Gr2) in zooming is provided on the object side of the second lens group (Gr2). The third lens group (Gr3) is constituted of a single biconcave negative lens element (sixth lens element L6). The fourth lens group (Gr4) is constituted of a single biconvex positive lens element (seventh lens element L7). A light receiving surface of an image sensor (SR) is arranged on the image side of the fourth lens group (Gr4) via a plane parallel plate (FT). The plane parallel plate (FT) corresponds to an optical low-pass filter, an infrared cutoff filter, a cover glass for an image sensor, or a like element. Alternatively, a mechanical shutter may be provided in place of the aperture stop (ST). The modification is also applied to Examples 2 and 3.

Referring to FIG. 4A, the surface attached with the symbol ri (i=1, 2, 3, . . . ) indicates the i-th lens surface from the object side (a cemented surface of a cemented lens element is counted as a lens surface), and the surface ri attached with an asterisk (*) indicates an aspherical surface. The aperture stop (ST), both surfaces of the plane parallel plate (FT), and the light receiving surface of the image sensor (SR) are each regarded as one lens surface. The same definition is also applied to the optical path diagrams (see FIGS. 5A and 6A) concerning Examples 2 and 3 to be described later, and the symbols in FIGS. 5A and 6A identical to those in FIG. 4A have basically the same meaning as in FIG. 4A. The above description, however, does not mean that all the identical symbols indicate the same element. For instance, although the identical symbol (r1) is attached to the lens surface closest to the object side throughout the drawings of FIGS. 4A, 5A, and 6A, this does not mean that the curvatures or a like feature of the lens surfaces attached with the symbol (r1) are identical throughout Examples.

In the above arrangement, an incident ray from the object side is transmitted through the first lens group (Gr1), the second lens group (Gr2), the third lens group (Gr3), the fourth lens group (Gr4), and the parallel plane plate (FT) in this order along the optical axis AX, and forms an optical image of the object on the light receiving surface of the image sensor (SR). Then, the image sensor (SR) converts the optical image corrected by the parallel plane plate (FT) into an electric signal. The electric signal is subjected to a predetermined processing such as digital image processing or image compression processing, according to needs. Thereafter, the processed signal is recorded in a memory of a digital camera, a mobile phone, or a like device, as a digital video signal, or transmitted to other digital apparatus wiredly or wirelessly.

As shown in FIGS. 4A through 4C, in Example 1, the first lens group (Gr1), the second lens group (Gr2), and the third lens group (Gr3) are movable in zooming, and the fourth lens group (Gr4) is fixed in zooming. Specifically, in zooming from the wide angle end (W) to the telephoto end (T), the first lens group (Gr1) is moved in such a manner that the trajectory thereof is convex toward the image side, and the second lens group (Gr2) and the third lens group (Gr3) are linearly moved toward the object side. As is obvious from the moving statuses shown in FIGS. 4A through 4C, the position of the third lens group (Gr3) at the telephoto end (T) is over the position of the second lens group (Gr2) at the wide angle end (W). In other words, the moving range of the second lens group (Gr2) and the moving range of the third lens group (Gr3) are partially overlapped. In Example 1 and the following Examples 2 and 3, the moving directions, the moving amounts, or the like of the lens groups may be varied depending on the optical powers of the lens groups, the lens arrangement, or a like condition.

Construction data concerning the lens elements in the zoom optical system 1A in Example 1 are shown in Tables 1 and 2. In the zoom optical system 1A, the fifth lens element L5, the sixth lens element L6, and the seventh lens element L7 are each a biaspherical lens element. The first through the fifth lens elements L1 through L5 are each a glass lens element, and the sixth and the seventh lens elements L6 and L7 are each a plastic lens element. Also, the values of the conditional expressions (1) through (6) in the case where the conditional expressions (1) through (6) are applied to the zoom optical system 1A in Example 1 are shown in Table 13 to be described later.

TABLE 1

| LENS SURFACE NO. | RADIUS OF CURVATURE (mm) | AXIAL SURFACE DISTANCE (mm) | | | REFRACTIVE INDEX | ABBE NUMBER |
|---|---|---|---|---|---|---|
| | | W | M | T | | |
| r1 | −95.301 | 0.500 | | | 1.80420 | 46.49 |
| r2 | 5.935 | 0.512 | | | | |
| r3 | 6.168 | 1.279 | | | 1.84666 | 23.78 |
| r4 | 9.985 | 10.8685 | 4.7253 | 1.2550 | | |
| r5: APERTURE STOP | ∞ | 0.100 | | | | |
| r6 | 4.422 | 1.085 | | | 1.77250 | 49.65 |
| r7 | 12.506 | 0.400 | | | 1.84666 | 23.78 |
| r8 | 5.522 | 0.597 | | | | |
| r9* | 6.191 | 1.275 | | | 1.58913 | 61.24 |
| r10* | −11.329 | 1.9702 | 2.6814 | 3.6194 | | |
| r11* | −511.528 | 0.700 | | | 1.60280 | 28.30 |
| r12* | 4.127 | 1.8944 | 4.2401 | 7.3384 | | |
| r13* | 504.819 | 1.740 | | | 1.60280 | 28.30 |
| r14* | −7.732 | 3.592 | | | | |
| r15 | ∞ | 0.500 | | | 1.51680 | 64.20 |
| r16 | ∞ | 0.000 | | | | |
| r17: IMAGING PLANE | ∞ | | | | | |

TABLE 2

| LENS SURFACE NO. | CONICAL COEFFICIENT k | ASPHERICAL COEFFICIENT | | | |
|---|---|---|---|---|---|
| | | A | B | C | D |
| r9 | 0 | −2.509701E−03 | −2.003272E−04 | 4.154238E−05 | −4.769509E−06 |
| r10 | 0 | 2.623827E−04 | −8.536618E−05 | 3.210558E−05 | −2.514705E−06 |
| r11 | 0 | 3.600429E−04 | −8.487727E−04 | 2.468387E−04 | −2.945187E−05 |
| r12 | 0 | 1.501283E−03 | −9.569609E−04 | 2.383663E−04 | −2.805102E−05 |
| r13 | 0 | 1.615398E−03 | −4.006983E−05 | 4.339016E−06 | 3.337404E−08 |
| r14 | 0 | 1.711253E−03 | 8.009101E−06 | −2.985121E−06 | 3.938805E−07 |

Table 1 indicates, from the left column thereof, the lens surface numbers, radii of curvature (unit: mm) of the respective lens surfaces, distances i.e. axial surface distances (unit: mm) between the lens surfaces in the optical axis direction at the wide angle end (W), the middle position (M), and the telephoto end (T) in an infinite focal state, refractive indexes of the respective lens elements, and the Abbe numbers of the respective lens elements. The value in each blank column regarding the axial surface distance at the middle position (M) and the telephoto end (T) is the same as that in the corresponding left column at the wide angle end (W). As shown in FIG. 4A, the surface attached with the symbol ri (i=1, 2, 3, . . . ) indicates the i-th lens surface from the object side on the optical path, and the surface ri attached with an asterisk (*) indicates an aspherical surface, namely, a refractive optical plane of an aspherical configuration or a plane having a refractive power substantially equivalent to the action of an aspherical plane. Since the aperture stop (ST), both surfaces of the plane parallel plate (FT), and the light receiving surface of the image sensor (SR) are flat, respective radii of curvature thereof are infinite (∞).

The aspherical configuration of the optical plane is defined by the following conditional expression (8), wherein a vertex on the lens surface is represented as the point of origin, and a local orthogonal coordinate system (x, y, z) is used, with the direction from the object toward the image sensor being the plus direction of z-axis.

$$z = \frac{ch^2}{1+\sqrt{1-(1+k)c^2h^2}} + Ah^4 + Bh^6 + Ch^8 + Dh^{10} \quad (8)$$

where z is a z-axis displacement at the height position h relative to the vertex on the lens surface, h is a height in a direction perpendicular to z-axis ($h^2=x^2+y^2$), c is a paraxial curvature (=1/radius of curvature), A, B, C, D are aspherical coefficients of 4th, 6th, 8th, and 10th orders, respectively, and k is a conical coefficient.

As is obvious from the conditional expression (8), the radii of curvature of the respective aspherical lens elements shown in Table 1 each shows a value approximate to the vertex on the lens surface of the corresponding lens element. Also, Table 2 shows the conical coefficient k of the aspherical surface (the i-th lens surface attached with the asterisk (*) in Table 1), and the aspherical coefficients A, B, C, and D.

Various data and zoom lens group data on the zoom optical system 1A in Example 1 are respectively shown in Table 3 and Table 4.

TABLE 3

|  | W(WIDE ANGLE END) | M(MIDDLE POSITION) | T(TELEPHOTO END) |
|---|---|---|---|
| FOCAL LENGTH | 6.0930 | 10.5540 | 17.3660 |
| F-NUMBER | 3.5500 | 4.5149 | 5.9000 |
| HALF ANGLE OF VIEW | 31.8956 | 18.2441 | 11.4555 |
| IMAGE HEIGHT | 3.6000 | 3.6000 | 3.6000 |
| ENTIRE LENGTH OF LENS UNIT | 27.5000 | 24.4260 | 24.9920 |
| BF | 0.5000 | 0.5000 | 0.5000 |

ZOOM RATIO = 2.85

TABLE 4

| LENS GROUP | FIRST LENS SURFACE | FOCAL LENGTH |
|---|---|---|
| 1 | r1 | −11.402 |
| 2 | r5 | 6.045 |
| 3 | r11 | −6.731 |
| 4 | r13 | 12.545 |

Figure 7:
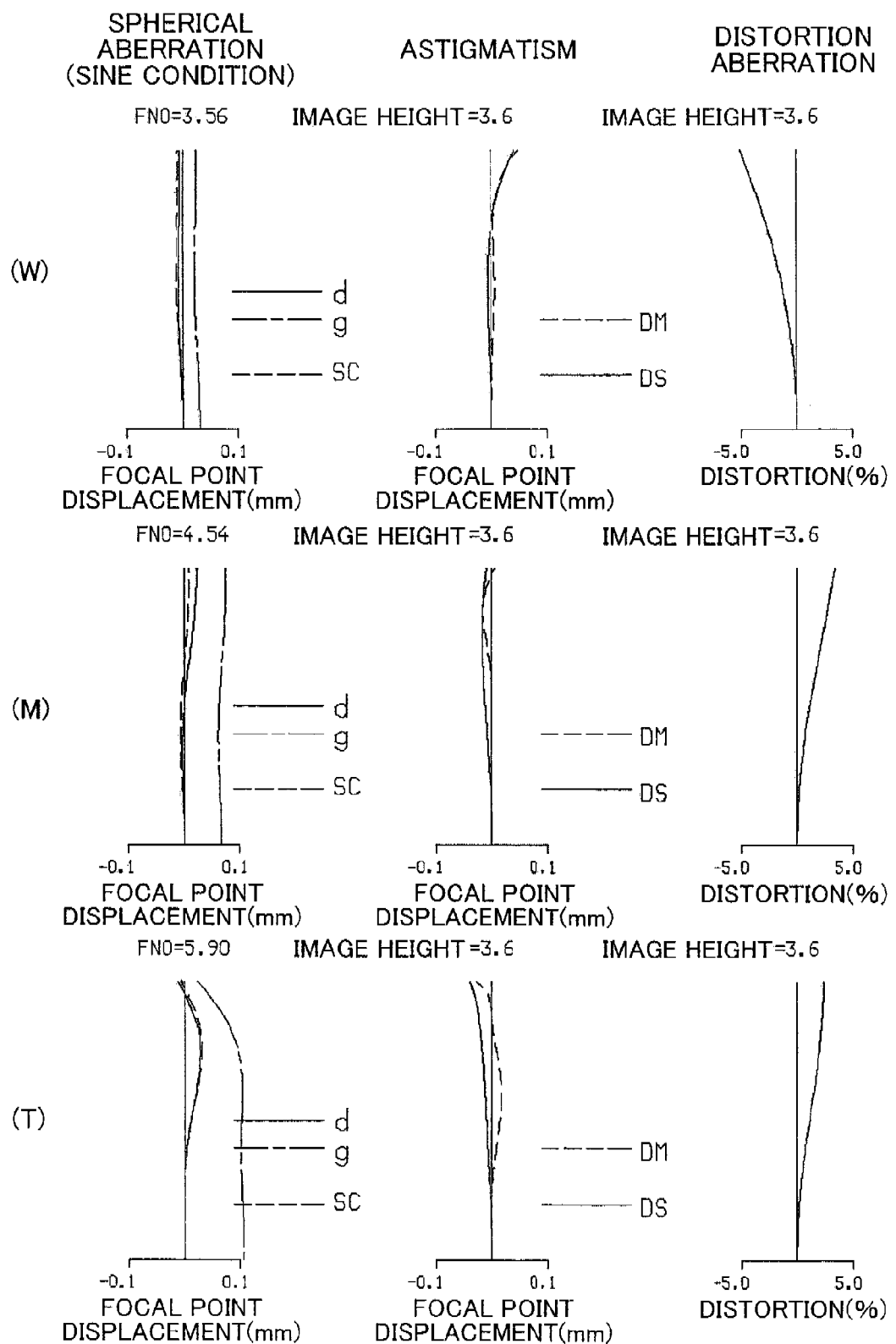
FIG. 7 is aberration diagrams showing spherical aberration, astigmatism, and distortion aberration of lens groups in Example 1.

Spherical aberration (sine condition), astigmatism, and distortion aberration of the zoom optical system 1A in Example 1 having the above lens arrangement and construction are shown in FIG. 7 from the left column in this order. Specifically, in FIG. 7, the aberrations at the wide angle end (W), the middle position (M), and the telephoto end (T) are shown in the uppermost row, the intermediate row, and the lowermost row, respectively. Each of the horizontal axes in the spherical aberration diagrams and the astigmatism diagrams shows a focal point displacement in the unit of mm. Each of the horizontal axes in the distortion aberration diagrams shows a distortion with respect to the entire image in terms of percentage. Each of the vertical axes in the spherical aberration diagrams shows a value standardized by the incident height, and each of the vertical axes in the astigmatism diagrams and the distortion aberration diagrams shows a height of an optical image i.e. an image height in the unit of mm.

In the spherical aberration diagrams, the solid lines "d" represent spherical aberrations in using yellow ray (wavelength: 587.56 nm), the one-dotted-chain lines "g" represent spherical aberrations in using blue ray (wavelength: 435.84 nm), and the broken lines "SC" represent unsatisfactory amounts of a sine condition. In the astigmatism diagrams, the broken lines "DM" and the solid lines "DS" respectively represent displacement results on a tangential (meridional) plane and a sagittal (radial) plane. Further, the astigmatism diagrams and the distortion aberration diagrams show displacement results in using yellow ray (wavelength: 587.56 nm).

EXAMPLE 2

Figure 5A:
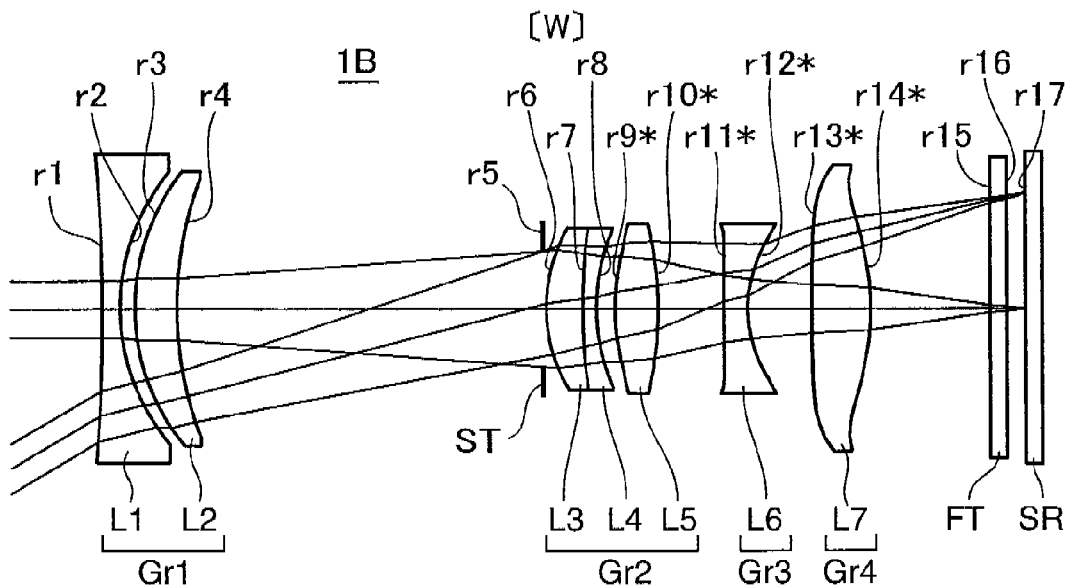
Figure 5B:
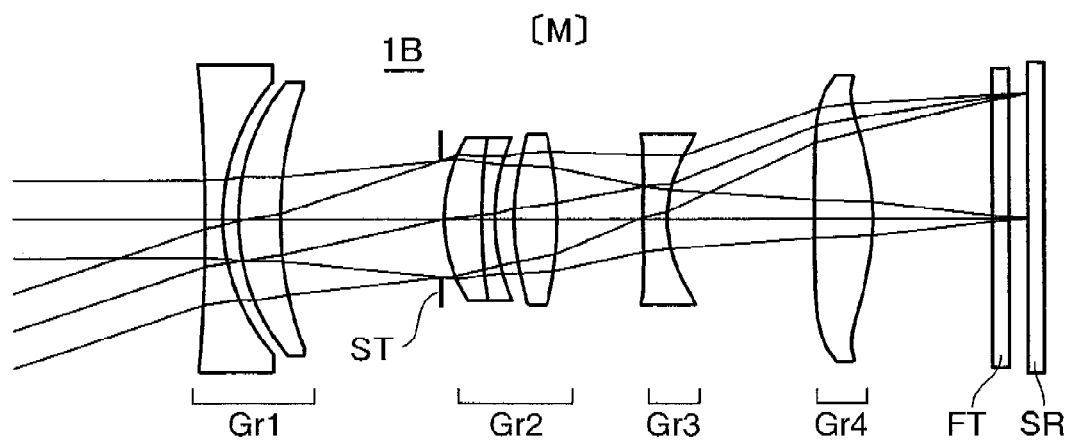
Figure 5C:
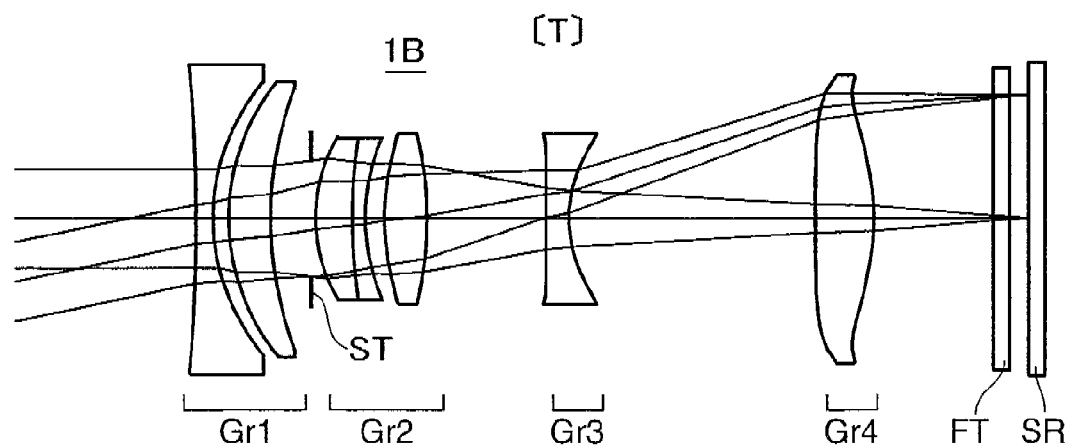

FIGS. 5A through 5C are cross-sectional views taken along the optical axis (AX), each showing an arrangement of lens groups in a zoom optical system 1B in Example 2. The zoom optical system 1B in Example 2 includes, in this order from the object side, a first lens group (Gr1) having a negative optical power as a whole, an aperture stop (ST), a second lens group (Gr2) having a positive optical power as a whole, a third lens group (Gr3) having a negative optical power, and a fourth lens group (Gr4) having a positive optical power. Specifically, the first lens group (Gr1) is constituted of a biconcave negative lens element (first lens element L1), and a positive meniscus lens element (second lens element L2) convex to the object side in this order from the object side. The second lens group (Gr2) is constituted of a cemented lens element made of a positive meniscus lens element (third lens element L3) convex to the object side and a negative meniscus lens element (fourth lens element L4) convex to the object side; and a biconvex positive lens element (fifth lens element L5) in this order from the object side. The third lens group (Gr3) is constituted of a single negative meniscus lens element (sixth lens element L6) convex to the object side. The fourth lens group (Gr4) is constituted of a single positive meniscus lens element (seventh lens element L7) convex to the image side.

In the zoom optical system 1B in Example 2 having the above lens arrangement, in zooming from the wide angle end (W) to the telephoto end (T), the first lens group (Gr1) is moved in such a manner that the trajectory thereof is convex toward the image side, and the second lens group (Gr2) and the third lens group (Gr3) are linearly moved toward the object side. The moving range of the second lens group (Gr2) and the moving range of the third lens group (Gr3) are partially overlapped. The fourth lens group (Gr4) is fixed. The aperture stop (ST) is moved together with the second lens group (Gr2) in zooming.

Construction data concerning the lens elements in the zoom optical system 1B in Example 2 are shown in Tables 5 and 6. As shown in Tables 5 and 6, and FIGS. 5A through 5C, in the zoom optical system 1B, the fifth lens element L5, the sixth lens element L6, and the seventh lens element L7 are each a biaspherical lens element. The first through the fifth lens elements L1 through L5 are each a glass lens element, and the sixth and the seventh lens element L6 and L7 are each a plastic lens element.

TABLE 7

|  | W(WIDE ANGLE END) | M(MIDDLE POSITION) | T(TELEPHOTO END) |
| --- | --- | --- | --- |
| FOCAL LENGTH | 6.1170 | 10.5950 | 17.4340 |
| F-NUMBER | 3.5588 | 4.5412 | 5.9000 |
| HALF ANGLE OF VIEW | 31.7936 | 18.1734 | 11.4034 |
| IMAGE HEIGHT | 3.6000 | 3.6000 | 3.6000 |
| ENTIRE LENGTH OF LENS UNIT | 27.5000 | 24.4970 | 24.8140 |
| BF | 0.5000 | 0.5000 | 0.5000 |

ZOOM RATIO = 2.85

TABLE 5

| LENS SURFACE NO. | RADIUS OF CURVATURE (mm) | AXIAL SURFACE DISTANCE (mm) | | | REFRACTIVE INDEX | ABBE NUMBER |
| --- | --- | --- | --- | --- | --- | --- |
| | | W | M | T | | |
| r1 | −57.493 | 0.500 | | | 1.81600 | 46.55 |
| r2 | 6.305 | 0.452 | | | | |
| r3 | 6.478 | 1.264 | | | 1.84666 | 23.78 |
| r4 | 10.982 | 10.9158 | 4.8103 | 1.2314 | | |
| r5: APERTURE STOP | ∞ | 0.100 | | | | |
| r6 | 4.709 | 1.094 | | | 1.80420 | 46.49 |
| r7 | 17.059 | 0.400 | | | 1.84666 | 23.78 |
| r8 | 5.976 | 0.565 | | | | |
| r9* | 6.480 | 1.285 | | | 1.58913 | 61.24 |
| r10* | −10.651 | 1.9522 | 2.6038 | 3.5396 | | |
| r11* | 212.377 | 0.700 | | | 1.60280 | 28.30 |
| r12* | 3.887 | 1.9475 | 4.3986 | 7.3581 | | |
| r13* | −141.576 | 1.748 | | | 1.60280 | 28.30 |
| r14* | −7.189 | 3.577 | | | | |
| r15 | ∞ | 0.500 | | | 1.51680 | 64.20 |
| r16 | ∞ | 0.000 | | | | |
| r17: IMAGING PLANE | ∞ | | | | | |

TABLE 6

| LENS SURFACE NO. | CONICAL COEFFICIENT k | ASPHERICAL COEFFICIENT | | | |
| --- | --- | --- | --- | --- | --- |
| | | A | B | C | D |
| r9 | 0 | −2.405276E−03 | −1.984933E−04 | 3.045217E−05 | −2.662185E−06 |
| r10 | 0 | 2.348635E−04 | −1.153730E−04 | 2.220304E−05 | −7.949135E−07 |
| r11 | 0 | 6.224288E−04 | −1.021729E−03 | 2.728484E−04 | −2.939668E−05 |
| r12 | 0 | 1.476624E−03 | −1.146589E−03 | 2.727921E−04 | −3.020640E−05 |
| r13 | 0 | 1.241223E−03 | 6.023786E−06 | 9.309203E−07 | 6.357100E−08 |
| r14 | 0 | 1.457212E−03 | 2.269639E−05 | −1.970818E−06 | 2.185194E−07 |

Figure 8:
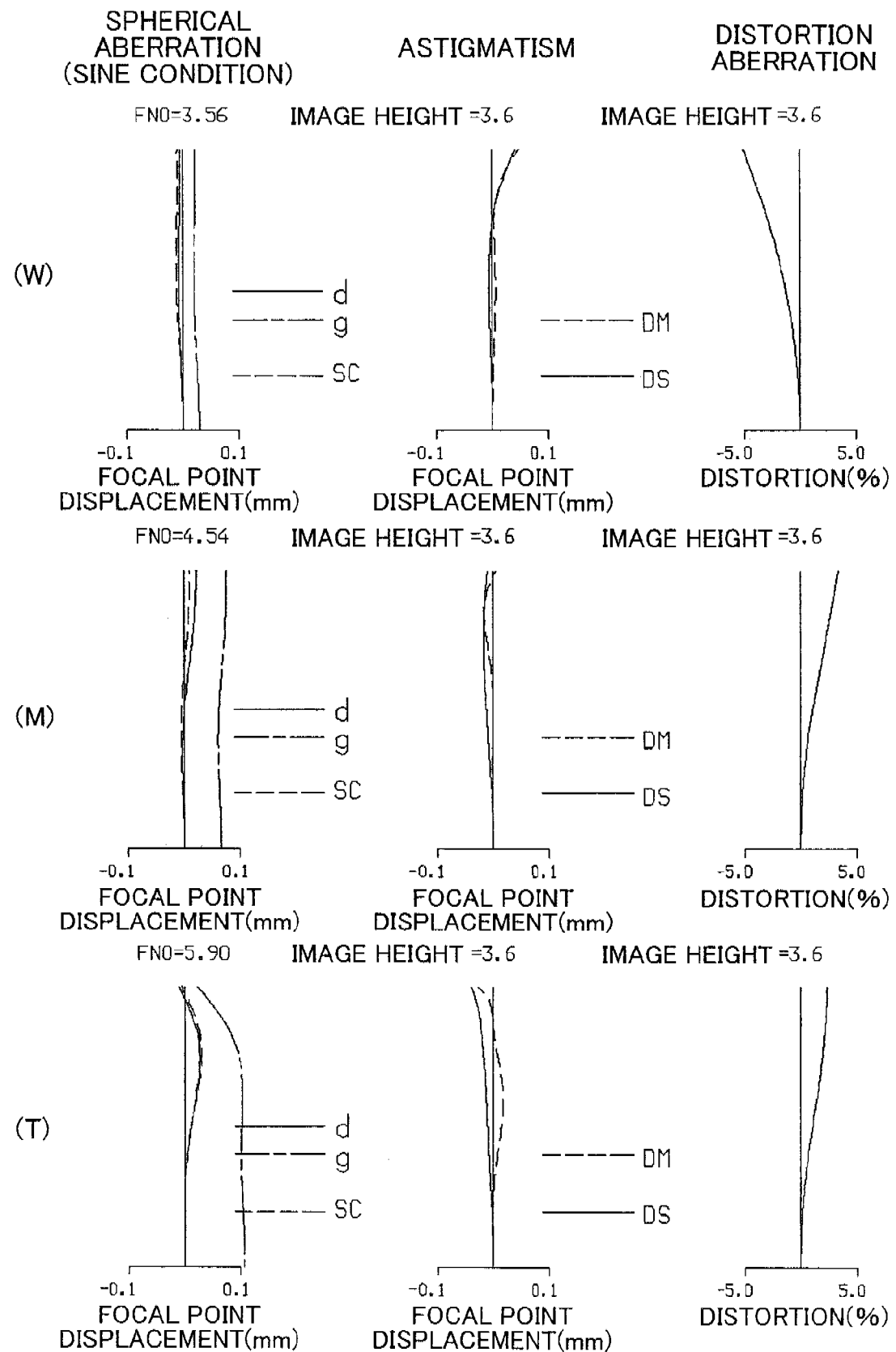
FIG. 8 is aberration diagrams showing spherical aberration, astigmatism, and distortion aberration of lens groups in Example 2.

Various data and zoom lens group data on the zoom optical system 1B are respectively shown in Table 7 and Table 8. Also, the values of the conditional expressions (1) through (6) in the case where the conditional expressions (1) through (6) are applied to the zoom optical system 1B are shown in Table 13 to be described later. Further, spherical aberration (sine condition), astigmatism, and distortion aberration of the zoom optical system 1B in Example 2 are shown from the left column in this order in FIG. 8.

TABLE 8

| LENS GROUP | FIRST LENS SURFACE | FOCAL LENGTH |
| --- | --- | --- |
| 1 | r1 | −11.472 |
| 2 | r5 | 5.975 |

TABLE 8-continued

| LENS GROUP | FIRST LENS SURFACE | FOCAL LENGTH |
|---|---|---|
| 3 | r11 | −6.522 |
| 4 | r13 | 12.399 |

EXAMPLE 3

Figure 6A:
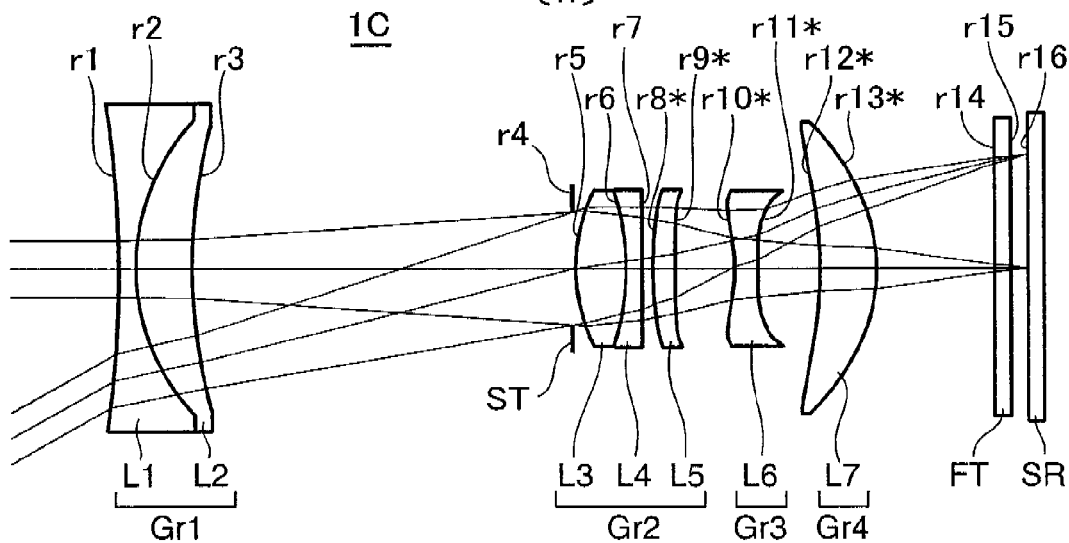
Figure 6B:
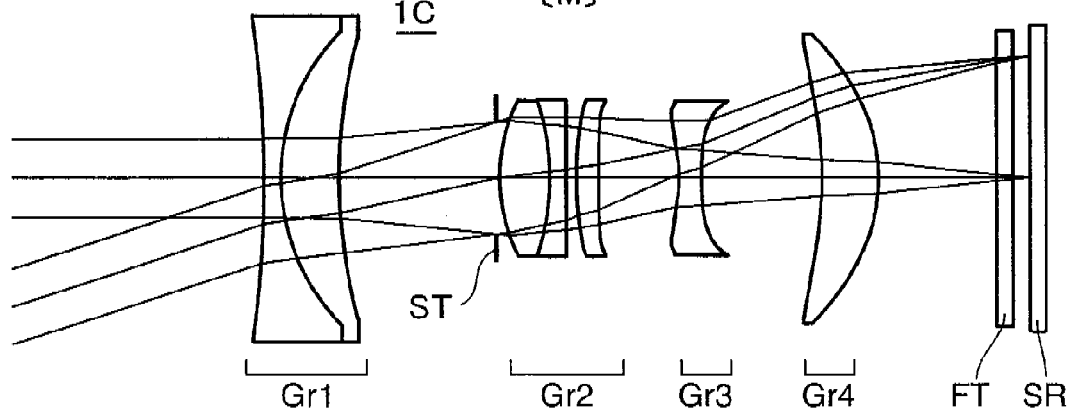
Figure 6C:
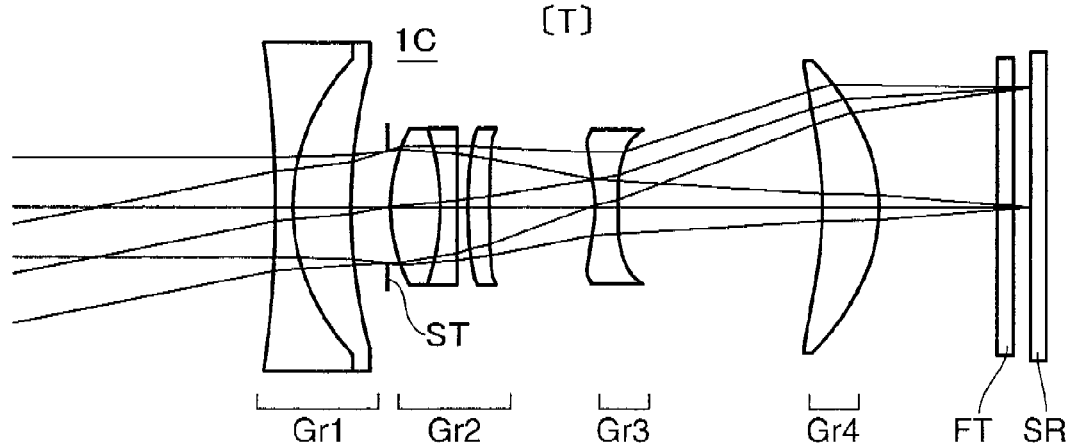

FIGS. 6A through 6C are cross-sectional views taken along the optical axis (AX), each showing an arrangement of lens groups in a zoom optical system 1C in Example 3. The zoom optical system 1C in Example 3 includes, in this order from the object side, a first lens group (Gr1) having a negative optical power as a whole, an aperture stop (ST), a second lens group (Gr2) having a positive optical power as a whole, a third lens group (Gr3) having a negative optical power, and a fourth lens group (Gr4) having a positive optical power. Specifically, the first lens group (Gr1) is constituted of a cemented lens element made of a biconcave negative lens element (first lens element L1), and a positive meniscus lens element (second lens element L2) convex to the object side in this order from the object side. The second lens group (Gr2) is constituted of a cemented lens element made of a biconvex positive lens element (third lens element L3) and a negative meniscus lens element (fourth lens element L4) convex to the image side; and a positive meniscus lens element (fifth lens element L5) convex to the object side in this order from the object side. The third lens group (Gr3) is constituted of a single negative meniscus lens element (sixth lens element L6) convex to the image side. The fourth lens group (Gr4) is constituted of a single positive meniscus lens element (seventh lens element L7) convex to the image side.

In the zoom optical system 1C in Example 3 having the above lens arrangement, in zooming from the wide angle end (W) to the telephoto end (T), the first lens group (Gr1) is linearly moved toward the image side until the middle position (M). The second lens group (Gr2) and the third lens group (Gr3) are linearly moved toward the object side. The moving range of the second lens group (Gr2) and the moving range of the third lens group (Gr3) are partially overlapped. The fourth lens group (Gr4) is fixed. The aperture stop (ST) is moved together with the second lens group (Gr2) in zooming.

Construction data concerning the lens elements in the zoom optical system 1C in Example 3 are shown in Tables 9 and 10. As shown in Tables 9 and 10, and FIGS. 6A through 6C, in the zoom optical system 1C, the fifth lens element L5, the sixth lens element L6, and the seventh lens element L7 are each a biaspherical lens element. The first through the fifth lens elements L1 through L5 are each a glass lens element, and the sixth and the seventh lens element L6 and L7 are each a plastic lens element.

TABLE 9

| LENS SURFACE NO. | RADIUS OF CURVATURE (mm) | AXIAL SURFACE DISTANCE (mm) | | | REFRACTIVE INDEX | ABBE NUMBER |
|---|---|---|---|---|---|---|
| | | W | M | T | | |
| r1 | −36.368 | 0.500 | | | 1.88300 | 40.80 |
| r2 | 6.465 | 1.741 | | | 1.84666 | 23.78 |
| r3 | 16.561 | 11.4634 | 4.7418 | 1.0881 | | |
| r4: APERTURE STOP | ∞ | 0.100 | | | | |
| r5 | 5.219 | 1.533 | | | 1.77250 | 49.65 |
| r6 | −7.686 | 0.500 | | | 1.80518 | 25.46 |
| r7 | −164.014 | 0.300 | | | | |
| r8* | 11.073 | 0.659 | | | 1.58913 | 61.24 |
| r9* | 46.717 | 1.8039 | 2.4276 | 3.2016 | | |
| r10* | −3.616 | 0.700 | | | 1.60280 | 28.30 |
| r11* | −62.109 | 1.8841 | 3.6328 | 6.1837 | | |
| r12* | −11.747 | 1.739 | | | 1.60280 | 28.30 |
| r13* | −5.192 | 3.577 | | | | |
| r14 | ∞ | 0.500 | | | 1.51680 | 64.20 |
| r15 | ∞ | 0.000 | | | | |
| r16: IMAGING PLANE | ∞ | | | | | |

TABLE 10

| LENS SURFACE NO. | CONICAL COEFFICIENT k | ASPHERICAL COEFFICIENT | | | |
|---|---|---|---|---|---|
| | | A | B | C | D |
| r8 | 0 | −1.903654E−03 | 8.883532E−04 | −3.256788E−04 | 4.607343E−05 |
| r9 | 0 | −1.265440E−04 | 1.441308E−03 | −5.592729E−04 | 8.493400E−05 |
| r10 | 0 | 4.390050E−02 | −7.547483E−03 | 1.412834E−04 | 1.169801E−04 |
| r11 | 0 | 4.140765E−02 | −4.106782E−03 | −6.201954E−04 | 1.605505E−04 |
| r12 | 0 | 1.090139E−04 | 8.356330E−05 | −3.542380E−06 | 4.404436E−08 |
| r13 | 0 | 8.760783E−05 | 5.164345E−05 | 0.000000 | 0.000000 |

Figure 9:
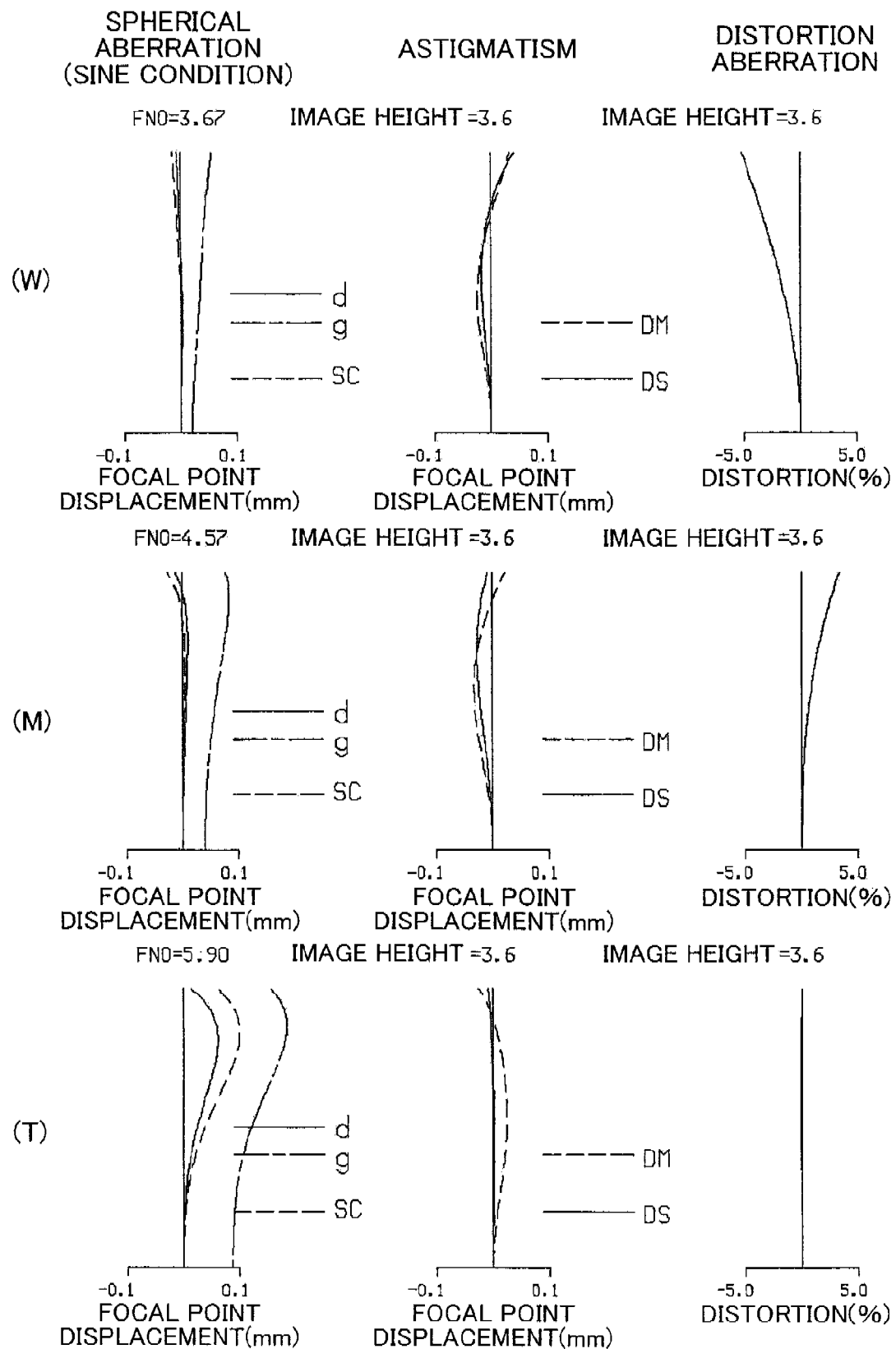
FIG. 9 is aberration diagrams showing spherical aberration, astigmatism, and distortion aberration of lens groups in Example 3.

Various data and zoom lens group data on the zoom optical system 1C are respectively shown in Table 11 and Table 12. Also, the values of the conditional expressions (1) through (6) in the case where the conditional expressions (1) through (6) are applied to the zoom optical system 1C are shown in Table 13 to be described later. Further, spherical aberration (sine condition), astigmatism, and distortion aberration of the zoom optical system 1C in Example 3 are shown from the left column in this order in FIG. 9.

TABLE 11

|  | W(WIDE ANGLE END) | M(MIDDLE POSITION) | T(TELEPHOTO END) |
|---|---|---|---|
| FOCAL LENGTH | 6.3000 | 10.9120 | 17.9550 |
| F-NUMBER | 3.6738 | 4.5710 | 5.9000 |
| HALF ANGLE OF VIEW | 31.0473 | 17.6931 | 11.3321 |
| IMAGE HEIGHT | 3.6000 | 3.6000 | 3.6000 |
| ENTIRE LENGTH OF LENS UNIT | 27.5000 | 23.1510 | 22.8220 |
| BF | 0.5000 | 0.5001 | 0.5001 |

ZOOM RATIO = 2.85

TABLE 12

| LENS GROUP | FIRST LENS SURFACE | FOCAL LENGTH |
|---|---|---|
| 1 | r1 | −12.053 |
| 2 | r4 | 5.501 |
| 3 | r10 | −6.346 |
| 4 | r12 | 13.912 |

TABLE 13

| CONDITIONAL EXPRESSION | EXAMPLE 1 | EXAMPLE 2 | EXAMPLE 3 |
|---|---|---|---|
| (1) (r1 + r2)/(r1 − r2) | 0.883 | 0.802 | 0.698 |
| (2) $f3/\sqrt{(fw \times ft)}$ | −0.654 | −0.632 | −0.597 |
| (3) nd2p | 1.68082 | 1.69667 | 1.68082 |
| (4) ($\beta 3t/\beta 3w$)/(ft/fw) | 0.466 | 0.467 | 0.449 |
| (5) $f2/\sqrt{(fw \times ft)}$ | 0.588 | 0.579 | 0.517 |
| (6) nd1n | 1.80420 | 1.81600 | 1.88300 |

As described above, the zoom optical systems 1A, 1B, and 1C in Examples 1, 2, and 3 satisfy the requirements in the embodiment of the invention. Accordingly, the zoom optical systems 1A, 1B and 1C have superior optical characteristics that spherical aberration is within 70 μm, field curvature is within 50 μm, and optical distortion is within 5.5% at any position of the wide angle end (W), the middle position (M), and the telephoto end (T) with respect to an image of 7.2 mm in spot diameter. Also, the entire length of the lens unit is 27.5 mm at maximum. The above features show that the zoom optical systems 1A, 1B, and 1C are sufficiently miniaturized.

The foregoing embodiment primarily includes the following arrangements.

A zoom optical system according to an aspect of the invention includes in the order from an object side: a first lens group having a negative optical power; a second lens group having a positive optical power; a third lens group having a negative optical power; and a fourth lens group having a positive optical power, wherein in zooming from a wide angle end to a telephoto end, at least the second lens group and the third lens group are moved in a state that a moving range of the second lens group is partially overlapped with a moving range of the third lens group, the first lens group is constituted of a negative lens element and a positive lens element, the second lens group is constituted of two or more lens elements, the third lens group is constituted of a negative lens element, and the zoom optical system satisfies the following conditional expressions (1), (2), and (3):

$$0 < (r1+r2)/(r1-r2) < 1.0 \quad (1)$$

$$-0.9 < f3/\sqrt{(fw \times ft)} < -0.4 \quad (2)$$

$$1.6 < ndp2 \quad (3)$$

where r1 is a curvature radius of an object-side lens surface of the negative lens element in the first lens group, r2 is a curvature radius of an image-side lens surface of the negative lens element in the first lens group, f3 is a focal length of the third lens group, fw is a focal length of an entirety of the optical system at the wide angle end, ft is a focal length of the entirety of the optical system at the telephoto end, and nd2p is an average refractive index of a positive lens element in the second lens group.

In the above arrangement, the first through the fourth lens groups having negative-positive-negative-positive optical powers are arranged in this order from the object side, and at least the second lens group and the third lens group are moved in zooming. Thereby, the zooming load is distributed to the second lens group and the third lens group. Also, since the moving range of the second lens group is partially overlapped with the moving range of the third lens group, the zoom optical system can be miniaturized while securing an intended zoom ratio.

In the above arrangement, the first lens group is constituted of the two lens elements i.e. the negative lens element and the positive lens element. The second lens group is constituted of the two or more lens elements. The third lens group is constituted of the single negative lens element. Providing the two lens elements i.e. the negative lens element and the positive lens element in the first lens group enables to correct chromatic aberration without using a diffractive optical element or a low dispersion glass element, which are disadvantageous in cost or production. The second lens group primarily plays a role in a converging action of the optical system. Accordingly, preparing the two or more lens elements in the second lens group enables to realize high optical performance. Since the height of an on-axis ray in the third lens group is relatively low, it is possible to realize high optical performance even with the single lens element. Also, since the third lens group generally serves as a focus lens group, constituting the third lens group of the single lens element enables to realize high-speed focusing, reduce the consumption electric power at the time of driving, and contribute to miniaturization of a driving actuator.

Satisfying the conditional expression (1) concerning the configuration of the negative lens element in the first lens group enables to miniaturize the zoom optical system while securing high optical performance. If the value of (r1+r2)/(r1−r2) is over the upper limit of the conditional expression (1), the negative lens element has a meniscus shape, i.e. is concave to the image side, with the result that the thickness of the first lens group may be unduly increased. This may obstruct miniaturization of the optical unit in a lens barrel collapsed condition. On the other hand, if the value of (r1+r2)/(r1−r2) is below the lower limit of the conditional expression (1), the curvature radius of the object-side lens surface of the negative lens element may be unduly decreased. This may increase off-axis aberration such as distortion or field curvature on the object-side lens surface.

Satisfying the conditional expression (2) concerning the optical power of the third lens group enables to miniaturize the optical system while securing high optical performance. If the configuration of the negative lens element in the first lens group lies in the range defined in the conditional expression (1), a large negative distortion may occur in the negative lens element. Setting the optical power of the third lens group so that the value of $f3/\sqrt{(fw \times ft)}$ is over the lower limit of the conditional expression (2) enables to cancel the negative distortion by a large positive distortion in the third lens group, and properly distribute the zooming load to the third lens group. Thus, the arrangement is advantageous in miniaturizing the optical system, while securing an intended zoom ratio. If the value of $f3/\sqrt{(fw \times ft)}$ is below the lower limit of the conditional expression (2), the aforementioned effect cannot be obtained. If, on the other hand, the value of $f3/\sqrt{(fw \times ft)}$ is over the upper limit of the conditional expression (2), the optical power of the third lens group may be unduly increased, which may make it difficult to correct off-axis aberration in the third lens group.

Satisfying the conditional expression (3) concerning the average refractive index of the positive lens element in the second lens group enables to secure high optical performance. If the average refractive index $nd2p$ is below the lower limit of the conditional expression (3), it is necessary to increase the curvature of the lens surface of the positive lens element in order to secure a positive optical power required in the second lens group, because the average refractive index of the positive lens element in the second lens group is excessively small. This may make it difficult to correct spherical aberration or coma aberration.

In the above arrangement, preferably, the zoom optical system may satisfy the following conditional expression (4):

$$0.3 < (\beta 3t/\beta 3w)/(ft/fw) < 0.6 \quad (4)$$

where $\beta 3t$ is a paraxial linear magnification of the third lens group at the telephoto end, and $\beta 3w$ is a paraxial linear magnification of the third lens group at the wide angle end.

The conditional expression (4) is a formula for defining the zooming load of the third lens group. If the value of $(\beta 3t/\beta 3w)/(ft/fw)$ is below the lower limit of the conditional expression (4), it is necessary to increase the zooming load of the second lens group in order to secure an intended zoom ratio, because the zooming load of the third lens group is unduly decreased. As a result, the optical power of the second lens group may be unduly increased, which may make it difficult to correct aberration. In other case, the moving amounts of the second lens group and the third lens group may be unduly increased to secure an intended zoom ratio, which may obstruct miniaturization of the zoom optical system. On the other hand, if the value of $(\beta 3t/\beta 3w)/(ft/fw)$ is over the upper limit of the conditional expression (4), the zooming load of the third lens group may be unduly increased, which may make it difficult to secure high optical performance in the entirety of the zoom range.

In any one of the above arrangements, preferably, the zoom optical system may satisfy the following conditional expression (5):

$$0.4 < f2/\sqrt{(fw \times ft)} < 0.8 \quad (5)$$

where $f2$ is a focal length of the second lens group.

The conditional expression (5) defines a desirable range of the optical power of the second lens group for miniaturizing the zoom optical system while securing high optical performance. If the value of $f2/\sqrt{(fw \times ft)}$ is below the lower limit of the conditional expression (5), the optical power of the second lens group may be unduly increased. This is advantageous in miniaturizing the zoom optical system, but may make it difficult to correct spherical aberration or coma aberration in the second lens group. On the other hand, if the value of $f2/\sqrt{(fw \times ft)}$ is over the upper limit of the conditional expression (5), the optical power of the second lens group may be unduly decreased. This is advantageous in correcting aberration, but may obstruct miniaturization of the zoom optical system.

In any one of the above arrangements, preferably, the zoom optical system may satisfy the following conditional expression (6):

$$1.7 < nd1n \quad (6)$$

where $nd1n$ is a refractive index of the negative lens element in the first lens group.

If the refractive index $nd1n$ is below the lower limit of the conditional expression (6), the curvature of a lens surface of the negative lens element may be unduly increased to secure a negative optical power required in the first lens group. This may increase off-axis aberration. Also, a reduced curvature radius of the negative lens element may unduly increase the thickness of the first lens group. This is not desirable in the aspect of miniaturizing the zoom optical system.

In the above arrangement, preferably, the positive lens element and the negative lens element in the second lens group may be arranged in this order from the object side. In this arrangement, more preferably, the positive lens element and the negative lens element in the second lens group may be cemented to each other.

In the zoom optical system according to the embodiment of the invention, the height of an on-axis ray to be incident onto the second lens group is increased by a diverging action of the first lens group having a negative optical power. In view of this, arranging the positive lens element in the second lens group at a position closest to the object side enables to decrease the height of an on-axis ray to be directed toward the image side with respect to the positive lens element. This enables to suppress generation of on-axis aberration. Further, spherical aberration or coma aberration on the positive lens element can be suppressed by arranging the negative lens element on the image side of the positive lens element.

In the above arrangement, preferably, a diaphragm may be provided on the object side of the second lens group, and a lens surface in the second lens group closest to an image side may be a lens surface having a positive optical power (or a negative optical power), the positive optical power being decreased (or the negative optical power being increased), as a distance from an optical axis is increased.

As described above, forming the lens surface in the second lens group at a position farthest from the diaphragm into an aspherical shape enables to simultaneously correct spherical aberration and astigmatism.

In the above arrangement, preferably, the negative lens element in the third lens group may be a lens element made of a plastic material.

Use of a lens element made of a plastic material as the negative lens element in the third lens group enables to reduce the production cost. Also, since the third lens group has the features that the height of an on-axis ray is relatively low, and that surface precision error and sensitivity on aberration fluctuation resulting from a temperature change are relatively small, it is suitable to use a plastic lens element in the third lens group. The third lens group generally serves as a focus lens group in a four-component optical system. Using a lens element made of a plastic material to reduce the weight of the lens group contributes to reduction of an electric power required for focus driving, and miniaturization of an actuator for focus driving.

In the above arrangement, preferably, the lens element made of the plastic material may be a lens element obtained by molding the plastic material, in which particles having a maximum diameter of 30 nm or less are dispersed.

Generally, mixing microparticles in a transparent resin material causes light scattering, which may lower the light transmittance. Accordingly, it is difficult to use a transparent resin material containing microparticles, as an optical material. However, light scattering can be substantially eliminated by setting the size of microparticles smaller than the wavelength of transmitted light rays. The refractive index of a plastic material is lowered, as the temperature rises. However, the refractive index of microparticles of an inorganic material, for instance, is increased, as the temperature rises. In view of this, a refractive index change can be substantially eliminated by utilizing and counteracting the temperature-dependent characteristics of the plastic material and the inorganic material. Specifically, dispersing particles having a maximum diameter of 30 nm or less in a plastic material as a base material enables to produce a resin material whose temperature-dependency on refractive index is significantly small. For instance, dispersing microparticles of niobium oxide ($Nb_2O_5$) in an acrylic resin enables to suppress a refractive index change by a temperature change. Accordingly, use of a particle-dispersed plastic material for producing at least one lens element is advantageous in minimizing a back focusing distance of the entirety of the zoom optical system in the embodiment of the invention, resulting from an ambient temperature change.

An image sensing device according to another aspect of the invention includes: an image sensor, with a light receiving surface, for converting an optical image into an electrical signal; and a zoom optical system for forming the optical image of a subject on the light receiving surface of the image sensor, wherein the zoom optical system has the aforementioned arrangement.

The above arrangement enables to realize a compact, high-precision, and zoomable image sensing device to be loaded in a compact digital camera or a like miniaturized device.

A digital apparatus according to yet another aspect of the invention includes: an image sensor, with a light receiving surface, for converting an optical image into an electrical signal; a zoom optical system for forming the optical image of a subject on the light receiving surface of the image sensor; and a controller for causing the image sensor to perform at least one of a still image photographing operation and a moving image photographing operation of the subject, wherein the zoom optical system has the aforementioned arrangement.

The above arrangement enables to realize a digital apparatus loaded with a zoomable image sensing device while securing high precision.

As described above, the embodiment of the invention is advantageous in providing a high-performance and compact zoom optical system capable of desirably correcting aberration in the entirety of the zoom range, as well as an image sensing device and a digital apparatus incorporated with the zoom optical system in a less-costly and sufficiently miniaturized manner.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A zoom optical system comprising in the order from an object side:
   a first lens group having a negative optical power;
   a second lens group having a positive optical power;
   a third lens group having a negative optical power; and
   a fourth lens group having a positive optical power, wherein
   in zooming from a wide angle end to a telephoto end, at least the second lens group and the third lens group are moved in a state that a moving range of the second lens group is partially overlapped with a moving range of the third lens group,
   the first lens group is constituted of a negative lens element and a positive lens element,
   the second lens group is constituted of two or more lens elements,
   the third lens group is constituted of a negative lens element, and
   the zoom optical system satisfies the following conditional expressions (1), (2), and (3):

$$0<(r1+r2)/(r1-r2)<1.0 \tag{1}$$

$$-0.9<f3/\sqrt{(fw \times ft)}<-0.4 \tag{2}$$

$$1.6<nd2p \tag{3}$$

where r1 is a curvature radius of an object-side lens surface of the negative lens element in the first lens group,
r2 is a curvature radius of an image-side lens surface of the negative lens element in the first lens group,
f3 is a focal length of the third lens group,
fw is a focal length of an entirety of the optical system at the wide angle end,
ft is a focal length of the entirety of the optical system at the telephoto end, and
nd2p is an average refractive index of a positive lens element in the second lens group.

2. The zoom optical system according to claim 1, wherein the zoom optical system satisfies the following conditional expression (4):

$$0.3<(\beta 3t/\beta 3w)/(ft/fw)<0.6 \tag{4}$$

where β3t is a paraxial linear magnification of the third lens group at the telephoto end, and
β3w is a paraxial linear magnification of the third lens group at the wide angle end.

3. The zoom optical system according to claim 1, wherein the zoom optical system satisfies the following conditional expression (5):

$$0.4<f2/\sqrt{(fw \times ft)}<0.8 \tag{5}$$

where f2 is a focal length of the second lens group.

4. The zoom optical system according to claim 2, wherein the zoom optical system satisfies the following conditional expression (5):

$$0.4<f2/\sqrt{(fw \times ft)}<0.8 \tag{5}$$

where f2 is a focal length of the second lens group.

5. The zoom optical system according to claim 1, wherein the zoom optical system satisfies the following conditional expression (6):

$$1.7<nd1n \tag{6}$$

where nd1*n* is a refractive index of the negative lens element in the first lens group.

6. The zoom optical system according to claim 2, wherein the zoom optical system satisfies the following conditional expression (6):

$$1.7 < nd1n \quad (6)$$

where nd1*n* is a refractive index of the negative lens element in the first lens group.

7. The zoom optical system according to claim 3, wherein the zoom optical system satisfies the following conditional expression (6):

$$1.7 < nd1n \quad (6)$$

where nd1*n* is a refractive index of the negative lens element in the first lens group.

8. The zoom optical system according to claim 1, wherein the positive lens element and a negative lens element in the second lens group are arranged in this order from the object side.

9. The zoom optical system according to claim 8, wherein the positive lens element and the negative lens element in the second lens group are cemented to each other.

10. The zoom optical system according to claim 1, wherein a diaphragm is provided on the object side of the second lens group, and a lens surface in the second lens group closest to an image side is a lens surface having a positive optical power, the positive optical power being decreased, as a distance from an optical axis is increased.

11. The zoom optical system according to claim 1, wherein a diaphragm is provided on the object side of the second lens group, and a lens surface in the second lens group closest to an image side is a lens surface having a negative optical power, the negative optical power being increased, as a distance from an optical axis is increased.

12. The zoom optical system according to claim 1, wherein the negative lens element in the third lens group is a lens element made of a plastic material.

13. The zoom optical system according to claim 12, wherein the lens element made of the plastic material is obtained by molding the plastic material, in which particles having a maximum diameter of 30 nm or less are dispersed.

14. An image sensing device, comprising:
an image sensor, with a light receiving surface, for converting an optical image into an electrical signal; and
a zoom optical system for forming the optical image of a subject on the light receiving surface of the image sensor, wherein
the zoom optical system includes in the order from an object side:
a first lens group having a negative optical power;
a second lens group having a positive optical power;
a third lens group having a negative optical power; and
a fourth lens group having a positive optical power, wherein
in zooming from a wide angle end to a telephoto end, at least the second lens group and the third lens group are moved in a state that a moving range of the second lens group is partially overlapped with a moving range of the third lens group,
the first lens group is constituted of a negative lens element and a positive lens element,
the second lens group is constituted of two or more lens elements,
the third lens group is constituted of a negative lens element, and
the zoom optical system satisfies the following conditional expressions (1), (2), and (3):

$$0 < (r1+r2)/(r1-r2) < 1.0 \quad (1)$$

$$-0.9 < f3/\sqrt{(fw \times ft)} < -0.4 \quad (2)$$

$$1.6 < nd2p \quad (3)$$

where r1 is a curvature radius of an object-side lens surface of the negative lens element in the first lens group,
r2 is a curvature radius of an image-side lens surface of the negative lens element in the first lens group,
f3 is a focal length of the third lens group,
fw is a focal length of an entirety of the optical system at the wide angle end,
ft is a focal length of the entirety of the optical system at the telephoto end, and
nd2*p* is an average refractive index of a positive lens element in the second lens group.

15. A digital apparatus, comprising:
an image sensor, with a light receiving surface, for converting an optical image into an electrical signal;
a zoom optical system for forming the optical image of a subject on the light receiving surface of the image sensor; and
a controller for causing the image sensor to perform at least one of a still image photographing operation and a moving image photographing operation of the subject, wherein
the zoom optical system includes in the order from an object side:
a first lens group having a negative optical power;
a second lens group having a positive optical power;
a third lens group having a negative optical power; and
a fourth lens group having a positive optical power, wherein
in zooming from a wide angle end to a telephoto end, at least the second lens group and the third lens group are moved in a state that a moving range of the second lens group is partially overlapped with a moving range of the third lens group,
the first lens group is constituted of a negative lens element and a positive lens element,
the second lens group is constituted of two or more lens elements,
the third lens group is constituted of a negative lens element, and
the zoom optical system satisfies the following conditional expressions (1), (2), and (3):

$$0 < (r1+r2)/(r1-r2) < 1.0 \quad (1)$$

$$-0.9 < f3/\sqrt{(fw \times ft)} < -0.4 \quad (2)$$

$$1.6 < nd2p \quad (3)$$

where r1 is a curvature radius of an object-side lens surface of the negative lens element in the first lens group,
r2 is a curvature radius of an image-side lens surface of the negative lens element in the first lens group,
f3 is a focal length of the third lens group,
fw is a focal length of an entirety of the optical system at the wide angle end,
ft is a focal length of the entirety of the optical system at the telephoto end, and nd2$p$ is an average refractive index of a positive lens element in the second lens group.

16. The zoom optical system according to claim 1, wherein the zoom optical system satisfies the following conditional expression (2'):

$$-0.75 < f3/\sqrt{(fw \times ft)} < -0.5 \qquad (2').$$

17. The zoom optical system according to claim 16, wherein the zoom optical system satisfies the following conditional expression (6):

$$1.7 < nd1n \qquad (6)$$

where nd1$n$ is a refractive index of the negative lens element in the first lens group.

18. The image sensing device according to claim 14, wherein the zoom optical system satisfies the following conditional expression (2'):

$$-0.75 < f3/\sqrt{(fw \times ft)} < -0.5 \qquad (2').$$

19. The image sensing device according to claim 18, wherein the zoom optical system satisfies the following conditional expression (6):

$$1.7 < nd1n \qquad (6)$$

where nd1$n$ is a refractive index of the negative lens element in the first lens group.

20. The digital apparatus according to claim 15, wherein the zoom optical system satisfies the following conditional expression (2'):

$$-0.75 < f3/\sqrt{(fw \times ft)} < -0.5 \qquad (2').$$

* * * * *